(12) United States Patent
McDowell

(10) Patent No.: US 7,918,909 B2
(45) Date of Patent: Apr. 5, 2011

(54) CYCLONE SEPARATOR WITH FINE PARTICLE SEPARATION MEMBER

(75) Inventor: David E. McDowell, Grand Rapids, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 503 days.

(21) Appl. No.: 11/832,919

(22) Filed: Aug. 2, 2007

(65) Prior Publication Data

US 2007/0266683 A1 Nov. 22, 2007

Related U.S. Application Data

(63) Continuation-in-part of application No. 11/162,164, filed on Aug. 31, 2005, now Pat. No. 7,748,079.

(60) Provisional application No. 60/522,213, filed on Sep. 1, 2004.

(51) Int. Cl.
*B01D 50/00* (2006.01)
(52) U.S. Cl. ........... 55/337; 55/428; 55/429; 55/424; 55/426; 55/459.1; 55/459.3; 55/503; 55/DIG. 3; 15/352; 15/353
(58) Field of Classification Search ............ 55/337, 55/428, 429, 424–426, 459.1–459.3, 462–465, 55/318; 15/353, 352
See application file for complete search history.

(56) References Cited

U.S. PATENT DOCUMENTS

| 3,235,090 | A | 2/1966 | Bose et al. | |
|---|---|---|---|---|
| 3,501,014 | A | 3/1970 | Fitch, Jr. et al. | |
| 6,168,716 | B1 | 1/2001 | Conrad et al. | |
| 6,221,134 | B1 | 4/2001 | Conrad et al. | |
| 6,344,064 | B1 | 2/2002 | Conrad | |
| 6,440,197 | B1 | 8/2002 | Conrad et al. | |
| 6,485,536 | B1 | 11/2002 | Masters | |
| 6,521,006 | B2 * | 2/2003 | Park et al. | 55/337 |
| 6,524,358 | B2 | 2/2003 | Yang | |
| 6,599,338 | B2 * | 7/2003 | Oh et al. | 55/337 |
| 6,613,129 | B2 | 9/2003 | Gen | |
| 6,746,500 | B1 | 6/2004 | Park et al. | |

(Continued)

FOREIGN PATENT DOCUMENTS

FR 2882912 A1 9/2006

(Continued)

OTHER PUBLICATIONS

Machine Translation of FR 2882912.*

*Primary Examiner* — Jason M Greene
*Assistant Examiner* — Dung Bui
(74) *Attorney, Agent, or Firm* — McGarry Bair PC

(57) ABSTRACT

A cyclone separator assembly comprises a cyclone separator that removes large particles of dirt from a working airstream as it flows through the cyclone separator, and the separated large particles of dirt are deposited into a dirt cup. The cyclone separator assembly further includes a fine particle separation member comprising a plurality of apertures for separating fine particles of dirt from air in the cyclone separator or the dirt cup. The fine particle separation member can be formed in a wall of the cyclone separator, a sidewall of the dirt cup, or in the outlet of the cyclone separator assembly. The cyclone separator assembly can further include a guide plate for creating a direction change in the path of the working airstream to aid in the separation of fine particles of dirt from air passing through the outlet.

20 Claims, 22 Drawing Sheets

U.S. PATENT DOCUMENTS

| | | | |
|---|---|---|---|
| 6,810,557 B2 | 11/2004 | Hansen et al. | |
| 7,618,470 B2 * | 11/2009 | Eddington et al. | 55/337 |
| 2003/0066156 A1 | 4/2003 | Yang | |
| 2003/0159411 A1 | 8/2003 | Hansen et al. | |
| 2004/0103495 A1 * | 6/2004 | Oh | 15/352 |
| 2004/0107530 A1 | 6/2004 | Lee | |
| 2004/0200028 A1 | 10/2004 | Oh et al. | |
| 2004/0237482 A1 | 12/2004 | Lim et al. | |
| 2005/0050863 A1 | 3/2005 | Oh | |
| 2006/0117723 A1 * | 6/2006 | Yoo | 55/428 |

FOREIGN PATENT DOCUMENTS

| | | |
|---|---|---|
| GB | 2019748 A | 11/1979 |
| JP | 20040107530 A | 3/2004 |

* cited by examiner

CYCLONE SEPARATOR WITH FINE PARTICLE SEPARATION MEMBER

CROSS REFERENCE TO RELATED APPLICATIONS

This application is a continuation-in-part of U.S. patent application Ser. No. 11/162,164, filed Aug. 31, 2005, now U.S. Pat. No. 7,748,079, issued Jul. 6, 2010, which claims priority on U.S. Provisional Application No. 60/522,213, filed on Sep. 1, 2004, both of which are herein incorporated by reference in their entirety.

BACKGROUND OF THE INVENTION

1. Field of the Invention

The invention relates to vacuum cleaners, and in particular to a cyclone separator for a vacuum cleaner. In one of its aspects, the invention relates to a vacuum cleaner with a fine contaminant separator for removing fine contaminants from the working air.

2. Description of the Related Art

Cyclone separators are well known. Some follow the textbook examples using frustoconical shaped separators and others use high-speed rotational motion of the dir-laden air to separate the dirt by centrifugal force. Separation of the dirt/dust from the air is not difficult, but the problem of keeping the dirt separated from the airflow has not been adequately solved. There is a tendency for the separated debris to re-entrain into the airflow and thereby pass through the separator or for fine particles/contaminants to remain in the airflow after passing through the cyclone separator. Some minor amounts of fine dust usually pass through the cyclone and are filtered in secondary filters located downstream of the cyclone separator to maximize dust removal. These filters are positioned anywhere from the cyclone exit port to the clean air exhaust port.

The U.S. Pat. No. 6,440,197 to Conrad attempts to solve the re-entrainment problem by placing an apertured particle separation member near the bottom of the cyclonic chamber. In this case, the apertured particle separation member allows the fine particles in the cyclonic airstream to pass through the apertures and come to rest in a relatively dead zone beneath the cyclone chamber. However, as larger particles of dirt collect on top of the separation member, the fine particles cannot pass through the apertured particle separation member into the dead zone. As a result, the fine particles are not separated from in the airstream and are eventually trapped in a downstream filter.

The U.S. Pat. No. 6,221,134 to Conrad et al. discloses another attempt to separate fine particles of dirt from a cyclonic air flow in a cyclone separator. Conrad et al. 134 discloses a fine particle-receiving chamber beneath the cyclonic fluid flow region. The fine particle-receiving chamber is formed beneath a particle-separating plate that extends across the width of the separator chamber and has a plurality of narrow slots sized for passing the fine particles from the separator chamber to the fine particle-receiving chamber. However, this separator plate has a problem similar to that found in the Conrad 197 patent; as large particles of dirt collect on the particle-separating plate, the larger particles block the path of the fine particles, with the result that a significant amount of fine particles cannot pass through the separator plate and remains in the cyclonic air flow.

The U.S. Pat. No. 6,344,064 to Conrad et al. discloses yet another attempt to separate fine particles from the airflow by utilizing a plurality of secondary cyclones arranged in parallel downstream of a primary upstream cyclone. A downstream particle collector is provided for the downstream cyclones, and the upstream cyclone has it own corresponding upstream particle collector. The particle collectors are configured such that the downstream particle collector is emptied when the upstream particle collector is emptied. Alternatively, the downstream particle collector can be emptied into the upstream particle collector whereby all of the particles are emptied through the upstream particle collector.

U.S. Pat. No. 6,810,557 to Hansen et al. discloses an upright vacuum cleaner that has a cyclone separator and a dirt cup. A horizontal plate separates the cyclone separator from the dirt cup. The air flowing through the cyclone separator passes through an annular cylindrical cage with baffles and through a cylindrical filter before exiting the cyclone separator at the upper end thereof. The dirt cup has three finger-like projections extending upwardly from the bottom thereof to agglomerate the dirt in the dirt cup. The dirt cup further has a pair of radial fins extending inwardly from the sidewalls of the dirt cup. The U.S. Patent Application Publication No. 20030159411 to Hansen et al. discloses a cyclone separator comprising a dirt separation module having a separator plate between the cyclone region and the dirt collection region. The separator plate has an outer diameter smaller than the inner diameter of the cylindrical wall of the dirt separation housing so that a gap separates the outer edge of the separator plate and the inner wall of the dirt tank. The U.S. Patent Application No. 60/481,542, filed Oct. 22, 2003, discloses a cyclone separator comprising a cyclone exhaust airflow directed through a fluid conduit positioned in the center of the cyclone region. Cyclone exhaust airflow passes through a filter chamber below the dirt collection region before entering the motor fan inlet.

SUMMARY OF THE INVENTION

According to the invention, a vacuum cleaner comprises a housing having a sidewall and a top wall defining a cyclonic airflow chamber for separating contaminants from a dirt-containing airstream, the housing further comprising an inlet and an outlet in fluid communication with the cyclonic airflow chamber, and, optionally, a dirt cup with a sidewall; a nozzle housing including a main suction opening, the main suction opening being fluidly connected with the housing inlet; an airstream suction source fluidly connected to the main suction opening and to the cyclonic airflow chamber for transporting dirt-containing air from the main suction opening to the cyclonic airflow chamber, wherein the suction source is adapted to establish and maintain the dirt-containing airstream from the main suction opening to the housing inlet; and a fine contaminant separation member formed in at least one of the walls of the cyclonic airflow chamber, the sidewall of the dirt cup, and the housing outlet, the fine contaminant separation member comprising a plurality of apertures for separating fine contaminants from the dirt-containing airstream as the dirt-containing airstream flows by the fine contaminant separation member.

According to one embodiment, the plurality of apertures are positioned in the housing outlet. The housing outlet can have an outlet chamber with an inlet in fluid communication with the cyclonic airflow chamber and an exhaust conduit, and the plurality of apertures is positioned in the outlet chamber. The outlet chamber comprises a side wall and the plurality of apertures is positioned in the side wall of the outlet chamber. A guide plate can be positioned in the outlet chamber for creating a direction change in the path of the dirt-containing airstream in the outlet chamber to aid in the separation of fine contaminants from the dirt-containing airstream. The guide plate can direct the dirt-containing airstream through a 180° turn. The plurality of apertures can be transverse to the path of the dirt-containing airstream, and can be circular in cross-section, elongated, or formed by louvers. The guide plate can alternatively comprises a plurality of vanes for imparting a circular motion to the dirt-containing airstream. The outlet chamber inlet is positioned centrally with respect to the vanes. In one embodiment, the guide plate is mounted for rotation with respect to the outlet chamber and the guide plate is rotatably driven by the dirt-containing airstream as it passes through the outlet chamber to increase the inertia of the particles in the dirt-containing airstream.

According to another embodiment, the vacuum cleaner further comprises a fine contaminant collector formed at least in part by the fine contaminant separation member and positioned adjacent to the at least one of the walls and the sidewall for collecting the fine contaminants after they pass through the fine contaminant separation member. The fine contaminant collector is formed by at least one side wall, a bottom wall, and at least in part by the fine contaminant separation member.

According to another embodiment, the fine contaminant separation member is formed in both of the cyclone separator sidewall and the dirt cup sidewall.

According to yet another embodiment, the apertures in the fine contaminant collector have a pattern that forms a dead space in which the fine contaminants are collected, and the fine contaminant separation member partitions the cyclonic airflow chamber from the dead space.

According to still another embodiment of the invention, the dirt cup is removably mounted to cyclonic airflow chamber sidewall.

In yet another embodiment, the vacuum cleaner further comprises a guide plate positioned in the housing outlet for creating a directional change in the path of the dirt-containing airstream in the housing outlet to aid in the separation of fine contaminants from the dirt-containing airstream.

Further according to the invention, a particle separator comprises a housing having a sidewall and a top wall defining a cyclonic airflow chamber for separating contaminants from a dirt-containing airstream, the housing further comprising an inlet and an outlet in fluid communication with the cyclonic airflow chamber, and a dirt cup including a sidewall beneath the cyclone airflow chamber and in communication therewith to receive dirt particles separated from the dirt-containing stream in the cyclonic airflow chamber; and at least one particle collector formed adjacent to at least one of the walls of the cyclonic airflow chamber, the sidewall of the dirt cup and the housing outlet and connected to the at least one of the cyclonic airflow chamber, dirt cup and the housing outlet through a fine contaminant separation member having a plurality of apertures for separating fine contaminants from air in the at least one of the cyclonic airflow chamber, the dirt cup and the housing outlet.

DESCRIPTION OF THE PREFERRED EMBODIMENTS

Figure 1:
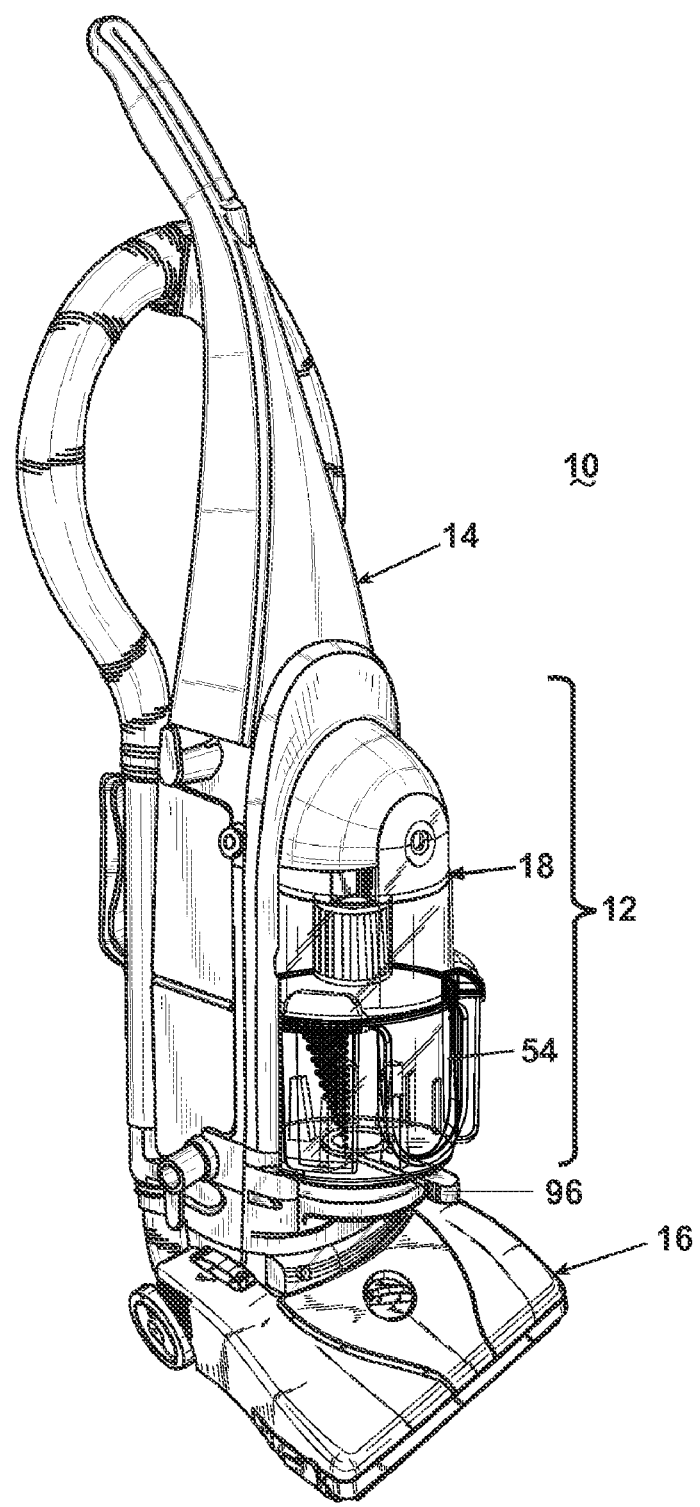
FIG. 1 is a perspective view of an upright vacuum cleaner with a cyclone separator assembly according to the invention.

An upright vacuum cleaner 10 with a cyclone separator assembly 12 according to one embodiment of the invention is shown in FIG. 1. The cyclone separator assembly 12 is mounted to an upright handle 14 pivotally mounted to a nozzle base housing 16 having a main suction opening adjacent the surface to be cleaned.

Figure 2:
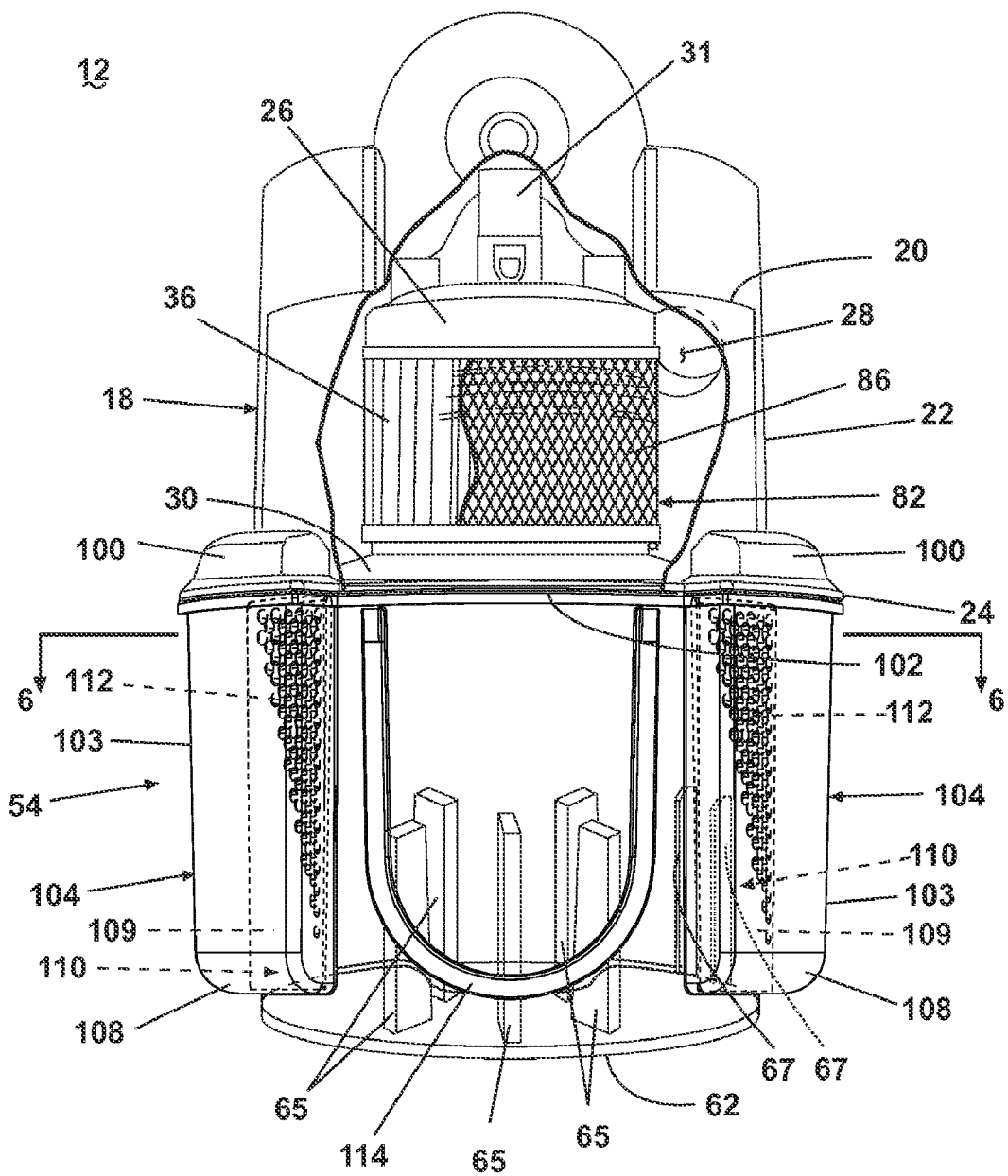
FIG. 2 is a perspective view of the cyclone separator assembly of FIG. 1, wherein a portion of a sidewall is cut away to illustrate the interior of the cyclone separator assembly.
Figure 3:
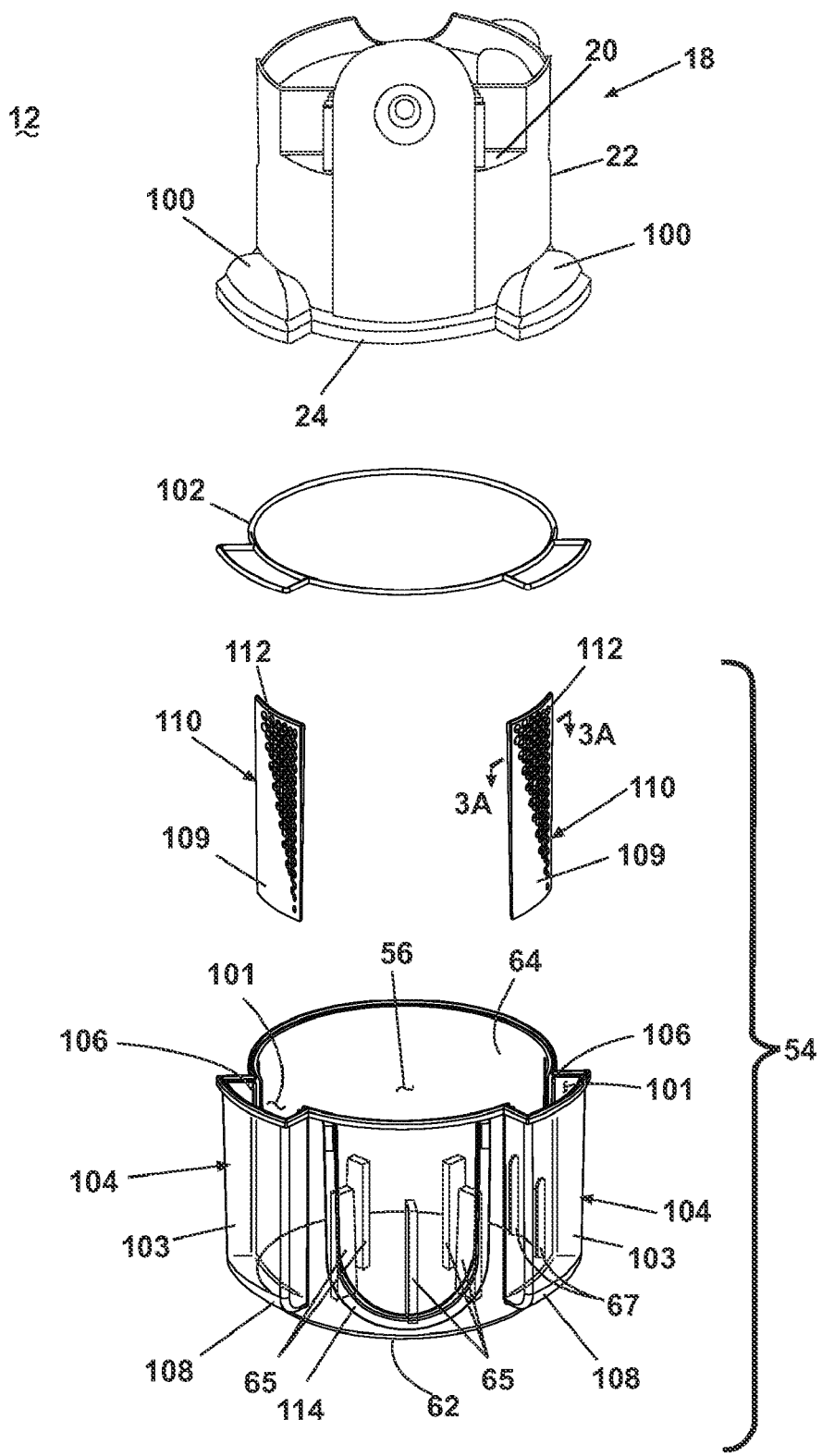
FIG. 3 is an exploded view of the cyclone separator assembly of FIG. 2.
Figure 4:
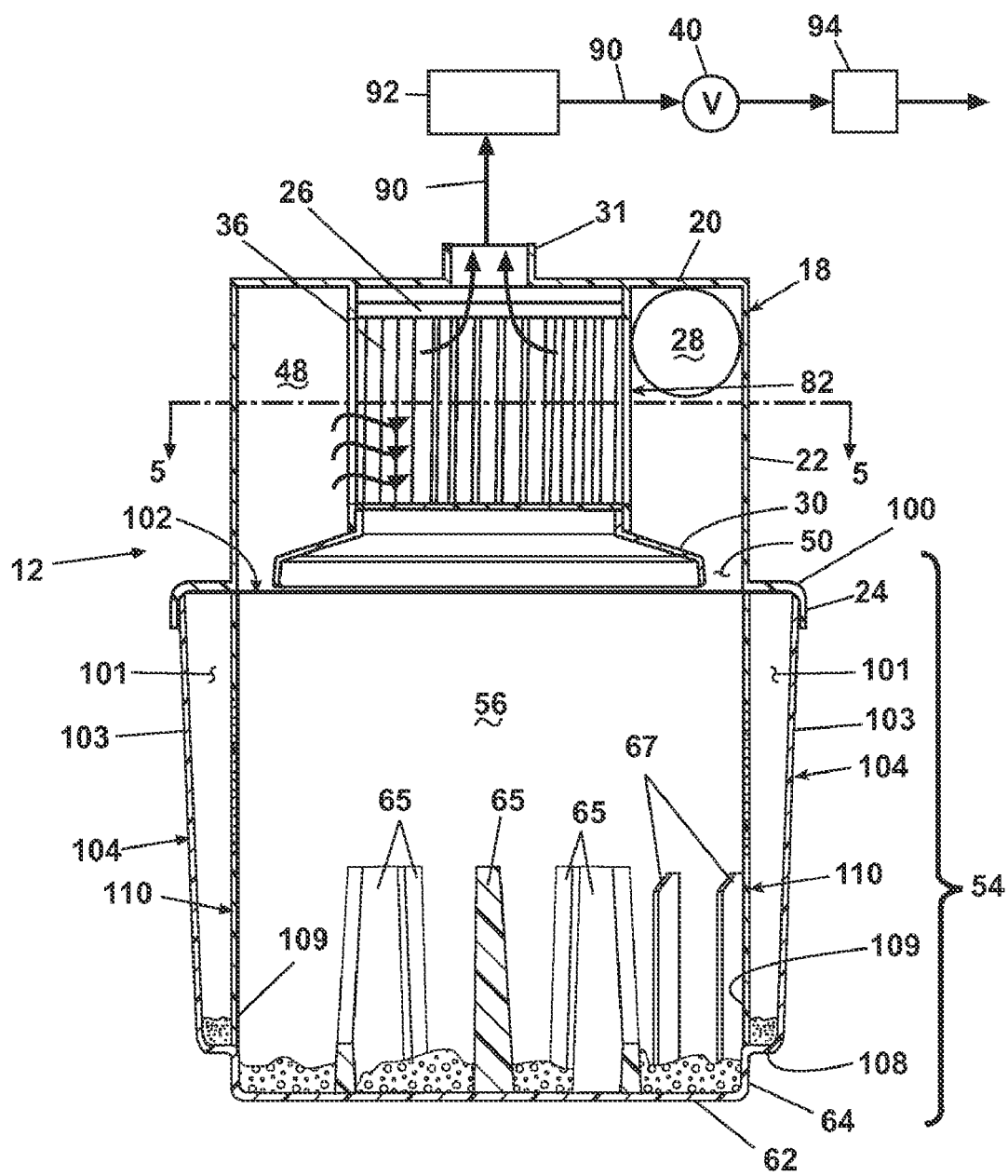
FIG. 4 is a schematic sectional view of the cyclone separator assembly of FIG. 2.

Referring to FIGS. 2-4, the cyclone separator assembly 12 according to the invention comprises a cylindrical cyclone separator 18 and a dirt cup 54 located below the cyclone separator 18. The cyclone separator 18 has a top wall 20 and a generally orthogonal, cylindrical sidewall 22 that terminates in a lower offset lip 24. An annular collar 26 depends from the top wall 20 and is centered in the cylindrical cyclone separator 18. An exhaust outlet 31 that extends through the top wall 20 in alignment with a central longitudinal axis of the annular collar 26 is fluidly connected with a suction source 40, such as a motor and fan assembly. The sidewall 22 further includes a tangential air inlet 28 aligned proximate the top wall 20 for generating a tangential airflow into the cyclone separator 18 and parallel to the top wall 20.

Figure 5:
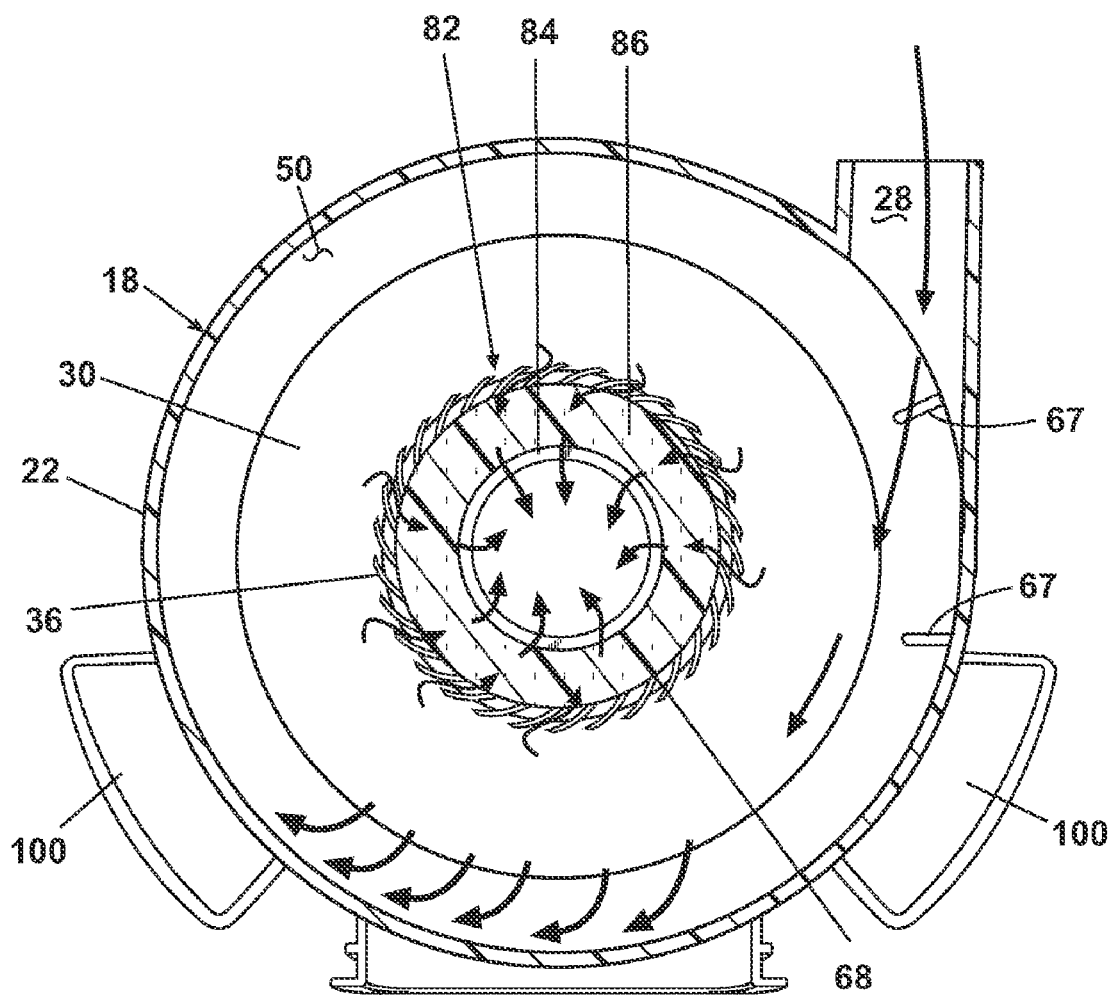
FIG. 5 is a schematic sectional view taken along line 5-5 of FIG. 4.

As seen in FIGS. 2 and 4, the cyclone separator 18 further comprises a filter assembly 82 having a cylindrical arrangement of louvers 36 depending from the collar 26 that depends from the top wall 20 of the cyclone separator 18. Referring to FIGS. 2 and 5, an optional, thick-walled cylindrical foam-type filter element 86 (not shown in FIG. 4) is arranged within the cyclone separator 18 within the louvers 36 and is held in place by a filter cage 84 (also not shown in FIG. 4). The filter cage 84 includes a perforated cylindrical wall and a centrally disposed locking insert (not shown) projecting upwardly within the filter cage 84 for mounting the filter cage 84 to the cyclone separator 18. A filter cage mounting projection (not shown) depends from the top wall 20 of the cyclone separator 18, within the cylinder formed by the louvers 36, to cooperate with the locking insert for mounting the filter cage 84 to the cyclone separator 18 in a substantially sealing fashion. The foam-type filter element 86 is thereby retained between the filter cage 84 and the louvers 36. The filter assembly 84 further comprises an inclined annular separator plate 30 mounted to a lower end of the louvers 36 to form an annular gap 50 between a lower end of the filter assembly 84 and the sidewall 22. An exemplary cyclone separator is disclosed in U.S. Pat. No. 6,810,557, which is incorporated herein by reference in its entirety.

The filter assembly 82 suspends from the top wall 20 and is oriented generally perpendicular to the top wall 20 and concentric with the sidewall 22 to form a toroidal cyclonic airflow chamber 48 between the cylindrical arrangement of louvers 36 and the sidewall 22. According to one embodiment, the tangential air inlet 28 is vertically aligned near the top wall 20 such that the tangential airflow from the tangential air inlet 28 is directed into the toroidal chamber 48. Any air passing from the toroidal chamber 48 and between the louvers 36 to the exhaust outlet 31 must pass through the optional foam-type filter element 86 before leaving the cyclone separator 18.

With further reference to FIGS. 2-5, the tangential airflow containing particulate matter passes through the tangential air inlet 28 and into the toroidal chamber 48 to travel around the filter assembly 82. As the airflow travels about the toroidal chamber 48, heavier dirt particles are forced toward the sidewall 22. These particles fall under the force of gravity through the gap 50 and are collected in the dirt cup 54 below the cyclone separator 18. The upper end of the dirt cup 54 is received in a nesting relationship in the lower offset lip 24 of the sidewall 22 to seal the cyclone separator 18 to the dirt cup 54 to form the cyclone separator assembly 12. The dirt cup 54 thereby performs the function of collecting the dirt separated from the airflow within the cyclone separator 18. A resilient seal 102 located between a lower surface of the lower offset lip 24 and an upper surface of the dirt cup 54 prevents air leakage therebetween.

The dirt cup 54 comprises a generally planar bottom wall 62 and an upstanding cylindrical sidewall 64 to form an open-topped dirt cup collection chamber 56, which is separated from the toroidal chamber 48 by the plate 30, except at the gap 50, when the dirt cup 56 is mounted beneath the cyclone separator 18. According to one embodiment, at least a portion of the sidewall 64 is constructed of a translucent material so that a user can view the dirt cup collection chamber 56 when the cyclone separator assembly 12 is mounted to the vacuum cleaner 10. The dirt cup 54 further comprises a dirt cup grip 114 that extends outwardly from the dirt cup sidewall 64 and away from the upright handle 14 when the dirt cup 54 is mounted to the vacuum cleaner 10. Preferably, the dirt cup grip 114 is integrally formed with the dirt cup sidewall 22; however, a separate grip can be attached to the sidewall 22 in a conventional manner such as with adhesives, screws, rivets, and the like.

A plurality of finger-like projections 65 extend vertically from the bottom wall 62 of the dirt cup 54, and a pair of vertical fins 67 extends radially inward from the sidewall 64 of the dirt cup 54. A description of the geometry of the finger-like projections 65 and the vertical fins 67 is provided in the aforementioned incorporated U.S. Pat. No. 6,810,557.

During operation of the cyclone separator assembly 12, the suction source 40 draws a working airstream through the main suction opening of the nozzle base housing 16 and into the tangential air inlet 28. The working airstream traverses through the toroidal chamber 48, casts dirt particles toward the sidewall 22, and exits the toroidal chamber 48 between the louvers 36. As seen in FIG. 5, the louvers 36 are oriented away from the direction of air flow (indicated by arrows) about the toroidal chamber 48. The velocity of the circulating air flow is altered as the air flow changes direction to pass around and between the louvers 36. This change in the velocity of the air flow causes the air flow to shed additional dirt particles. These dirt particles and the aforementioned separated dirt particles that are cast toward the sidewall 22 fall into the dirt cup 54 through the gap 50.

The portion of the air flow that passes between the louvers 36 then passes through the optional foam-type filter element 86, which filters dirt of a selected particle size. The air then flows through the exhaust outlet 31, an exhaust/suction conduit 90, and through a secondary (pre-motor) filter 92 before reaching the suction source 40. The pre-motor filter 92 removes additional particulate matter from the exhaust airstream prior to the airstream being drawn through the suction source 40. A post-motor filter 94 can also be provided downstream of the suction source 40 to remove additional fine particulate matter from the exhaust airstream before it is released to the atmosphere.

A known phenomenon in cyclone separators is the re-entrainment of dirt into circulating air after the dirt is deposited in a dirt containment vessel positioned beneath the cyclone separation chamber. It has been discovered that this re-entrainment is due to a vertical component of air circulation within the dirt cup 54 between the gap 50 and the dirt cup bottom wall 62. Generally, the air flow pattern has the strongest vertical component at the bottom portion of the dirt cup 54 below the tangential air inlet 28 to the cyclone separator 18. Suitable features to minimize re-entrainment of debris in the dirt cup are described in the aforementioned incorporated U.S. Pat. No. 6,810,557.

Another problem associated with cyclone separators is the removal of fine particles/contaminants from the airstream. Typically, the fine particles are eventually removed by the pre-motor filter 92, which can become clogged and lead to a loss in suction and a decrease in the performance of the vacuum cleaner 10. To alleviate this problem, the cyclone separator assembly 12 according to the invention comprises a fine particle separation member to separate fine particles from the airstream as the airstream passes therethrough. As a result, fewer fine particles reach the pre-motor filter 92, thereby reducing the probability of clogging the pre-motor filter 92 and the resulting loss of suction at the nozzle and consequent degradation of cleaning performance.

With continued reference to FIGS. 2-4, the cyclone separator assembly 12 comprises at least one and preferably two fine particle collectors 104 formed in the dirt cup sidewall 64 and extending radially away from the circular center of the dirt cup 54. The fine particle collectors 104 comprise a plurality of side walls 103, an open top 106, and a closed bottom 108. The side walls 103 and the closed bottom 108 form a fine particle collection chamber 101 that opens into the dirt cup collection chamber 56. The lower offset lip 24 of the cyclone separator 18 extends radially outward beyond the sidewall 22 at two circumferentially spaced locations, thereby forming a pair of integral fine particle collector tops 100 that form top walls for covering the open tops 106 of the fine particle collectors 104 when the dirt cup 54 is mounted below the cyclone separator 18. In the embodiment of FIGS. 1-6, the cyclone separator 18 comprises two circumferentially spaced fine particle collector tops 100, and the dirt cup 54 comprises two fine particle collectors 104. However, any number of particle collector tops 100 fine particle collectors 104 can be formed in any locations of the cyclone separator assembly 12.

A fine particle separation member 110 comprising a plurality of apertures 112 forms a wall that joins the side walls 103 to close the opening from the fine particle separation chamber 101 into the dirt cup collection chamber 56 and thereby separates the fine particle collection chamber 101 from the dirt cup collection chamber 56. While the fine particle separation member 110 separates the fine particle collection chamber 101 from dirt cup collection chamber 56, the two spaces communicate through the apertures 112 in the fine particle separation member 110. Thus, fine particles entrained in the air in the dirt collection chamber 56 can pass through the apertures 112 to the fine particle collection chamber 101.

In the current embodiment, the apertures 112 decrease in surface area from an upstream side to a downstream side of the fine particle separation member 110. As a result of this configuration, the fine particle separation member 110 has on the downstream side a solid wall portion 109 that forms a dead space in the fine particle collection chamber 101 for collecting and holding fine particles that pass through the apertures 112. The pattern, such as the shape and distribution, of the apertures 112 determines the shape and location of the solid wall portion 109 and the dead space. In the current embodiment, the apertures 112 are patterned such that the apertures 112 and the solid wall portion 109 meet at a generally diagonal juncture, and the dead space is generally triangular shaped at a downstream end of the fine particle collector 104.

Figure 3A:
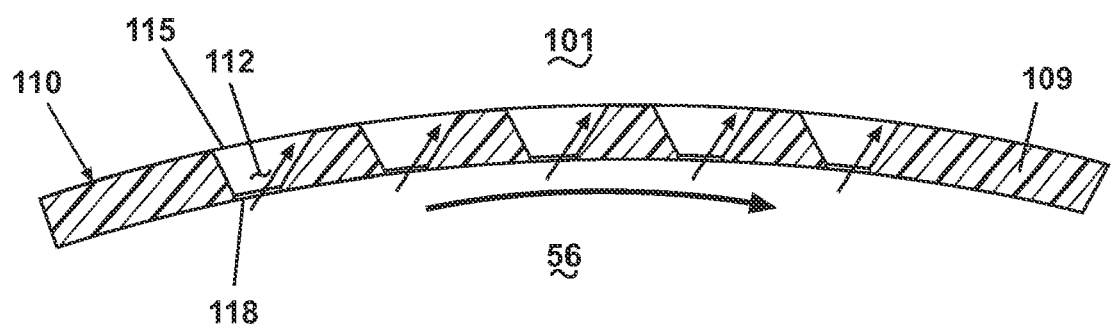
FIG. 3A is a sectional view taken along line 3A-3A of FIG. 3.

The plurality of apertures 112 in the fine particle separation member 110 can be configured in any suitable geometry. In the current embodiment, the apertures 112 are truncated cone-shaped apertures, as shown in FIG. 3A, wherein the cone tapers from an outlet/cone base 115 facing the fine particle collection chamber 101 to an inlet 118 facing the dirt cup collection chamber 56 so that the apertures 112 are less susceptible to clogging. Additionally, the apertures 112 are oriented parallel, or in-line, with the airstream in the dirt cup 54.

Figure 6:
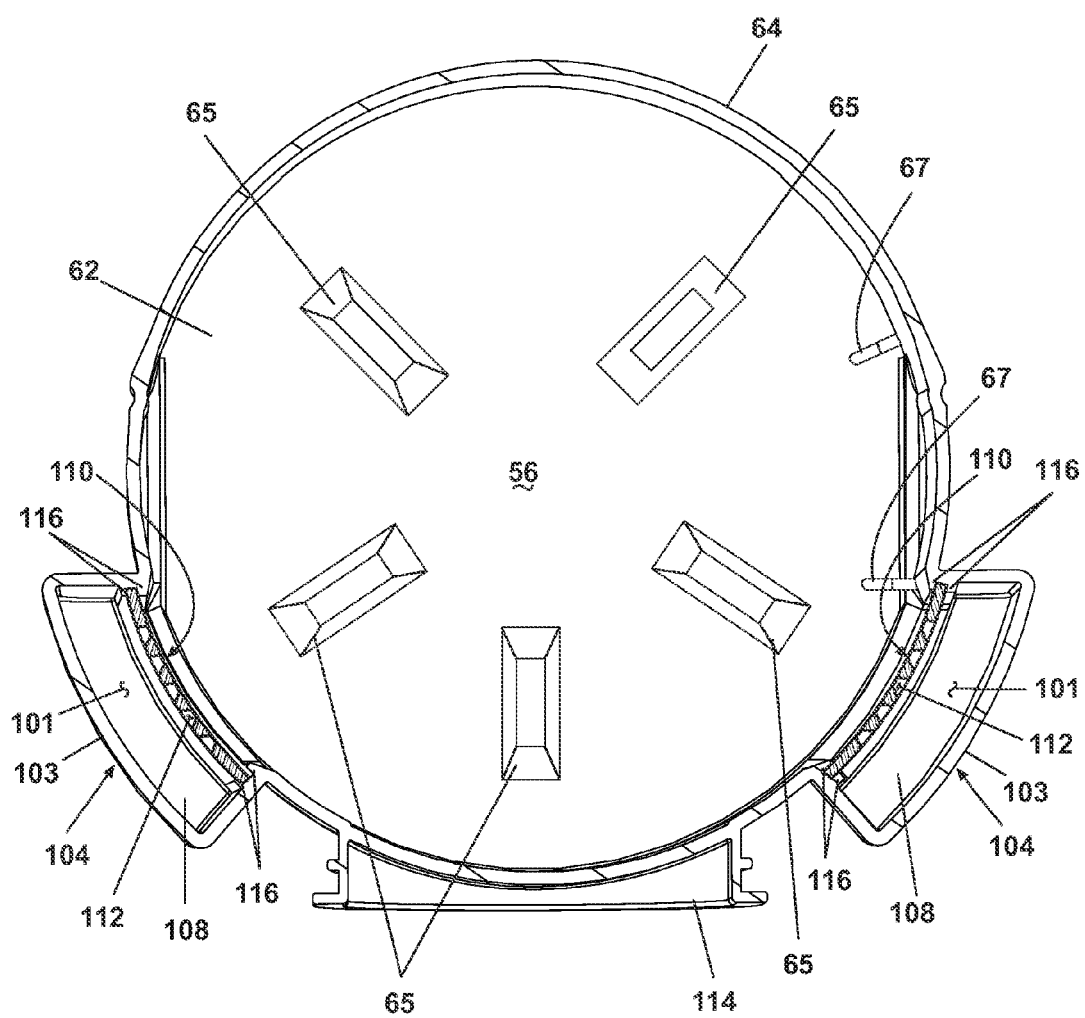
FIG. 6 is a sectional view taken along line 6-6 of FIG. 2.

As best seen in FIGS. 3A and 6, the fine particle separation member 110 has a curvature similar to that of the cylindrical sidewall 64 of the dirt cup 54 so that the fine particle separation members 110 essentially form a continuous wall with the sidewall 64. The fine particle separation member 110 can be integrally formed with the dirt cup 54 as part of the dirt cup sidewall 64 or can be a separate piece that is mounted, such as in a removable fashion, to the dirt cup 54. In the embodiment of FIG. 6, a pair of support ribs 116 in the dirt cup 54 facilitates mounting the fine particle separation member 110 to the dirt cup 54. The support ribs 116 form a groove sized to slidingly receive side edges of the fine particle separation member 110. Thus, the fine particle separation member 110 can be inserted into and removed from the dirt cup 54 by sliding the fine particle separation member 110 between the ribs 116 from above when the dirt cup 54 is not mounted below the cyclone separator 18.

According to one embodiment, the dirt cup 54 comprises five projections 65, and two of the projections 65 are oriented in spaced relation relative to the fine particle separation members 110. As shown in FIG. 6, the two projections 65 are radially aligned with the respective fine particle separation members 110 and are centrally positioned, i.e., positioned about midway between the upstream and downstream sides of the fine particle separation members 110. The remaining three projections 65 are oriented as described in the U.S. Pat. No. 6,810,557. As a result, the five projections 65 are oriented in a pentagon shape, as shown in FIG. 6. The fins 67, which are spaced related to one another, are located upstream of the fine particle separation members 110 and downstream of the cyclone inlet 28.

During operation, the primary separation of debris occurs in the cyclone separator 18 as described above. However, some fine particles remain entrained in the moving air within the dirt cup 54. As the air moves around in the dirt cup 54, inertia carries entrained fine particles of dirt toward the dirt cup sidewall 64 and, thus, the fine particle separation members 110, which are essentially continuous with the sidewall 64. As the air passes over the fine particle separation member 110 from the upstream side to the downstream side of the fine particle separation member 110, the inertia of the fine particles throws the fine particles through the plurality of apertures 112 in the fine particle separation member 110. Because the apertures 112 are oriented parallel, or in-line, with the airstream, the fine particles enter the apertures without making a significant change in direction. After passing through the apertures 112, the fine particles come to rest in the relatively dead space of the fine particle collection chamber 101, where re-entrainment of the fine particles into the moving air path in the dirt cup collection chamber 56 is minimized. The direction of the fine particles through the apertures 112 of the fine particle separation member 110 is indicated by arrows in FIG. 3A.

The dirt cup 54 is removably connected to the cyclone separator 18 for emptying the dirt cup collection chamber 56 and the fine particle collection chambers 101. The dirt cup 54 is generally vertically adjustable relative to the cyclone separator 18, such as by a cam mechanism 96 (FIG. 1), so that it can be raised into an engaged and operative position underneath the cyclone separator 18. When the dirt cup 54 is raised, the upper edge of the dirt cup sidewall 64 is received within the offset lip 24 of the cyclone separator 18 to thereby seal the dirt cup 54 with the cyclone separator 18 and to prevent the dirt cup 54 from being dislodged from the cyclone separator 18. To remove the dirt cup 54 from the cyclone separator 18, such as to discard dirt accumulated on the dirt cup collection chamber 56 and in the fine particle collection chambers 101, the dirt cup 54 is displaced downwardly from the cyclone separator 18, such as by movement of the cam mechanism 96. Once disengaged from the offset lip 24, the dirt cup 54 can be removed from the separator 18 and taken to an appropriate receptacle for emptying, such as by turning the dirt cup 54 upside down.

The fine particle collectors 104, including the fine particle separation members 110, can be positioned anywhere in the cyclone separator assembly 12 other than at the bottom of the cyclone separator 18 or bottom of the dirt cup 54. Suitable locations for the fine particle collectors 104 include the cyclone sidewall 22, the dirt cup side wall 64, or the cyclone top wall 20.

Figure 7:
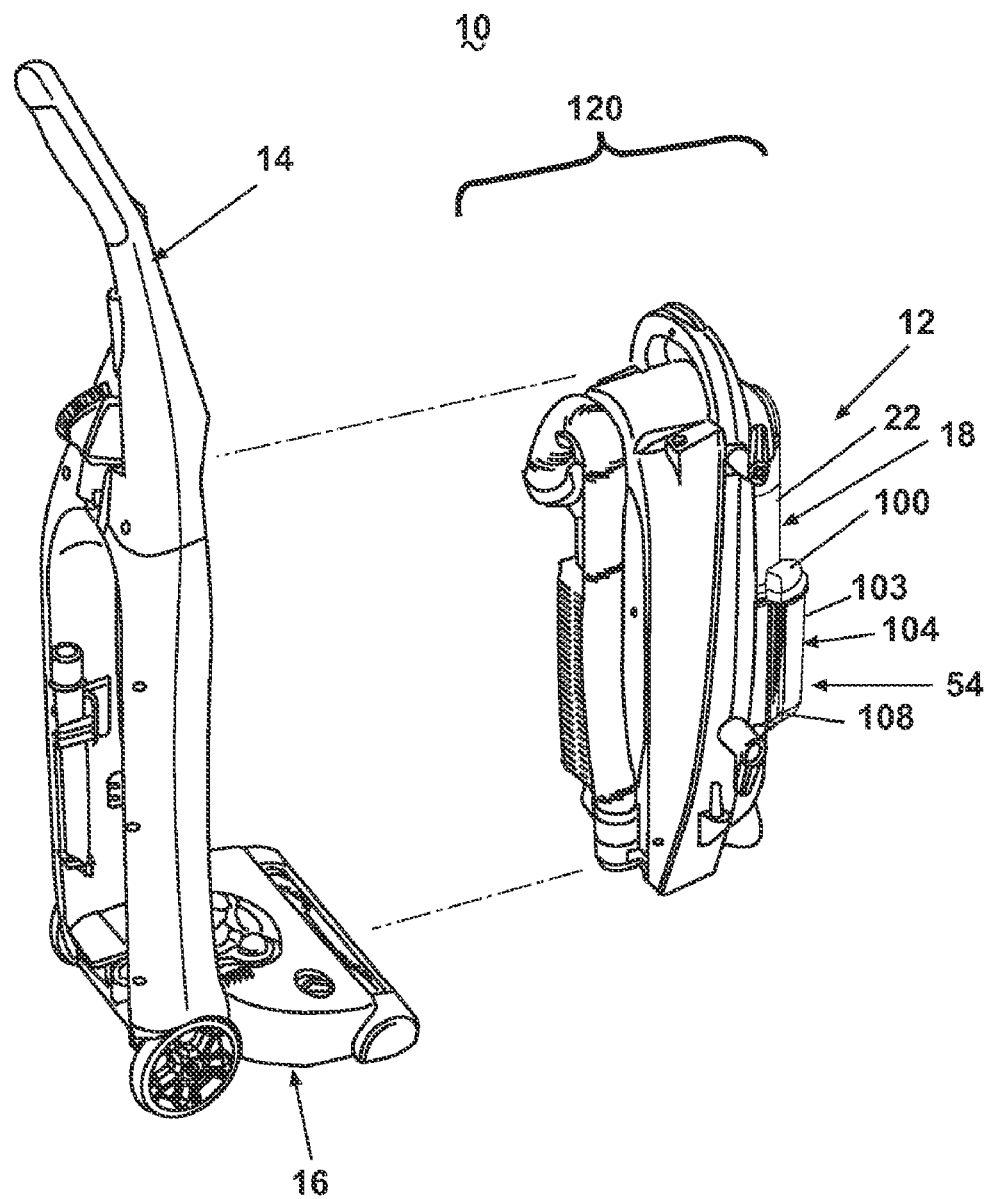
FIG. 7 is a perspective view of an alternative upright vacuum cleaner with the cyclone separator assembly of FIG. 2.

An alternative vacuum cleaner with the cyclonic dirt separator assembly 12 is illustrated in FIG. 7. The cyclone separator assembly 12 forms a portion of a pod 120 that is removable from the upright handle 14 for use separate from the upright handle 14. A vacuum cleaner with a detachable cyclonic vacuum module or pod is described in detail in U.S. Patent Application Publication No. 2004/0216263, which is incorporated herein by reference in its entirety.

Figure 8:
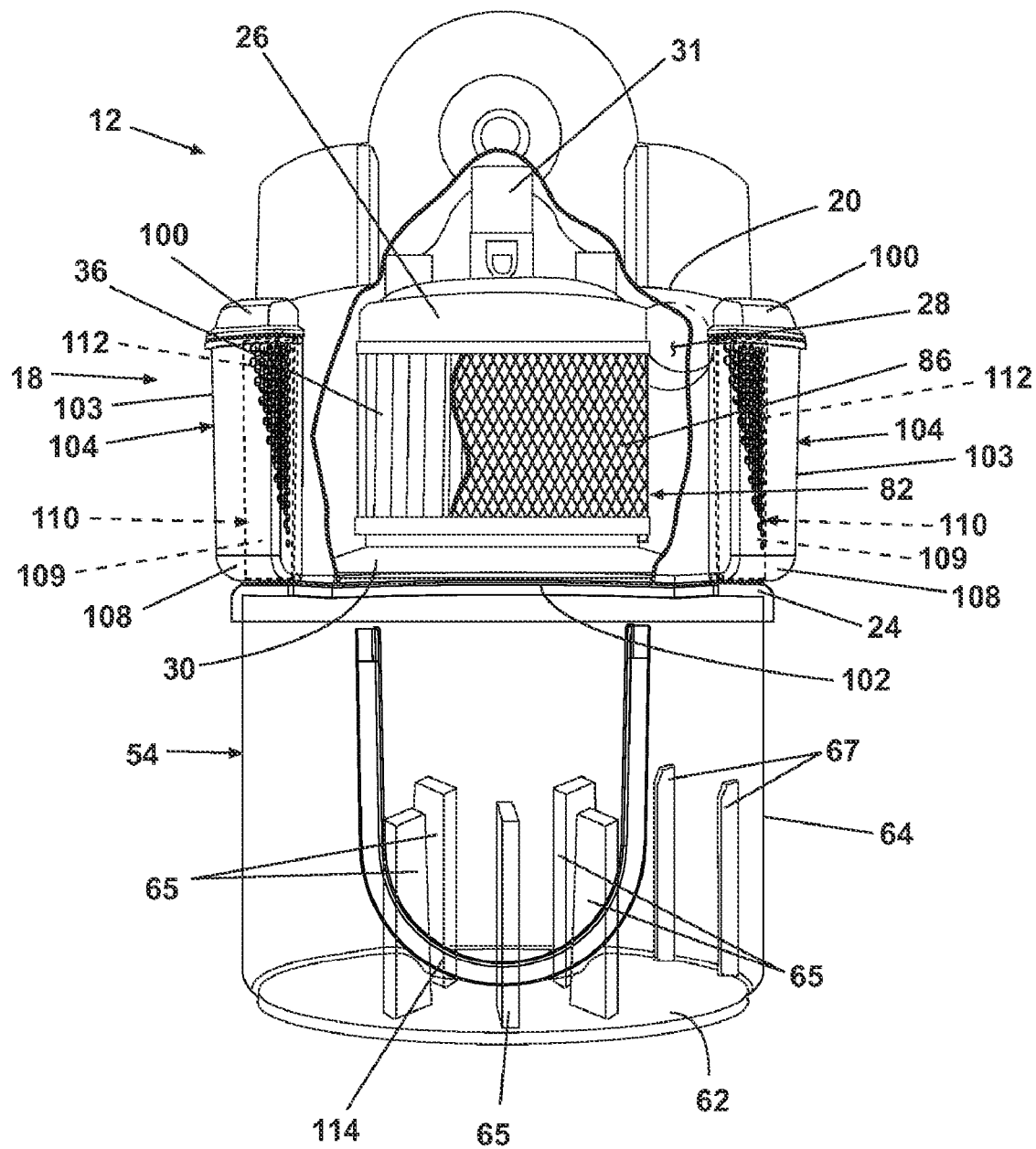
FIG. 8 is a perspective view of a second embodiment cyclone separator assembly according to the invention, wherein a portion of a sidewall is cut away to illustrate the interior of the cyclone separator assembly.
Figure 9:
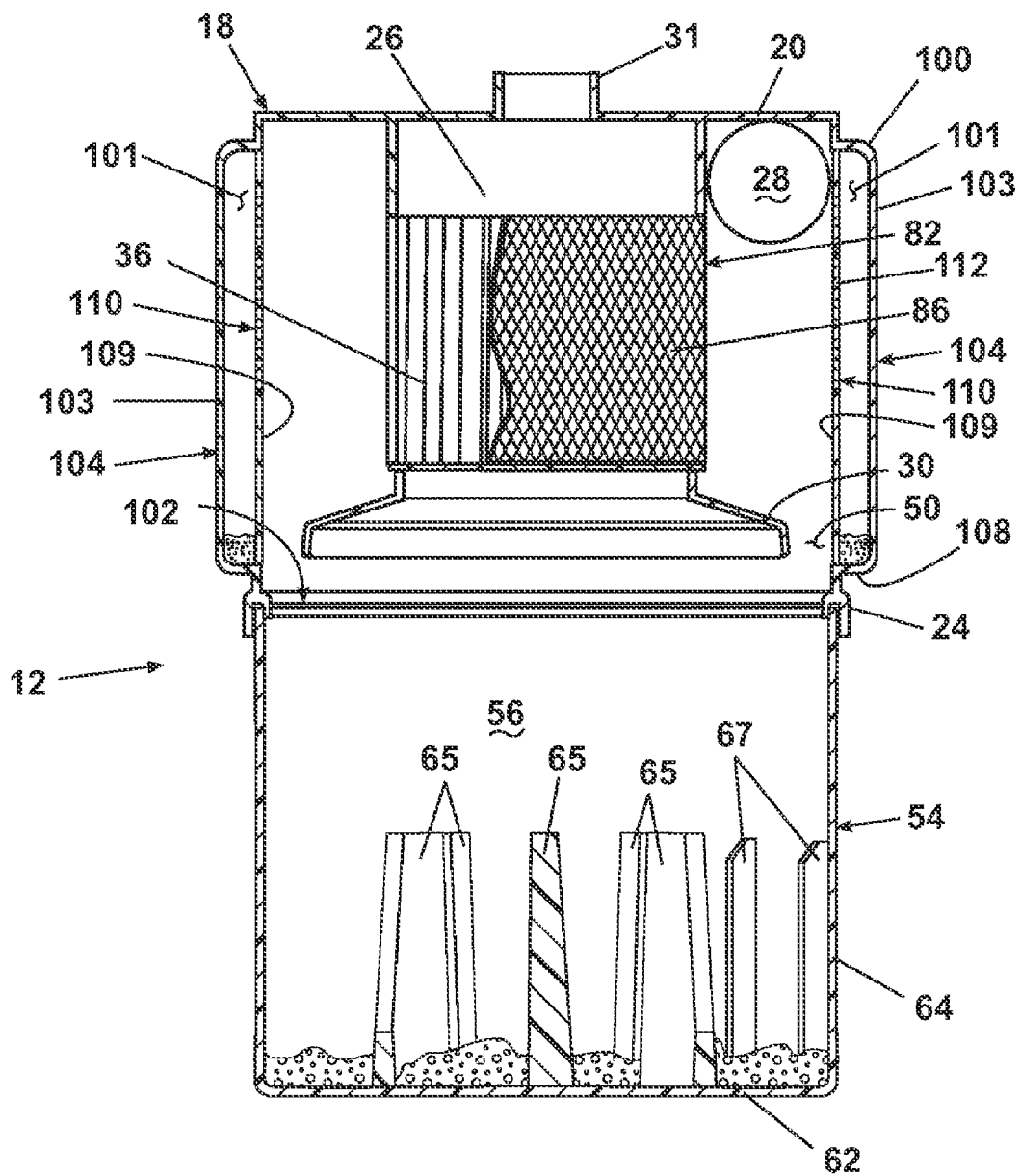
FIG. 9 is a schematic sectional view of the cyclone separator assembly of FIG. 8.

A second embodiment of a cyclone separator assembly 12 is illustrated in FIGS. 8 and 9, where components similar to those of the first embodiment cyclone separator assembly 12 are identified with the same reference numeral. The cyclone separator assembly 12 is identical to the first embodiment cyclone separator assembly 12 of FIGS. 1-6, except that in the second embodiment, the fine particle collectors 104 are formed in the cyclone sidewall 22 rather than in the dirt cup sidewall 64. During operation, the working airstream enters the tangential air inlet 28 and flows in a cyclonic fashion around the sidewall 22. As the air circulates, large particles entrained in the airstream are separated therefrom and fall through the gap 50 to the bottom of the dirt cup 54. As described above with respect to the first embodiment, the air remains entrained with fine particles and passes by the fine particle separation members 110. Inertia carries the entrained fine particles toward the cyclone sidewall 22 and, thus, the fine particle separation members 110. As the air passes over the fine particle separation members 110, the inertia of the fine particles throws the fine particles through the plurality of apertures 112 in the fine particle separation members 110 and into the dead space within the fine particle collection chambers 101 of the fine particle collectors 104.

In both the first and the second embodiments of the cyclone separator assembly 12, the fine particle collectors 104 have been described as a portion of either the cyclone separator 18 or the dirt cup 54. However, the cyclone separator assembly 12 of either embodiment can comprise a unitary housing that can be removed from the vacuum cleaner 10 as a single entity combining both the cyclone separator 18 and the dirt cup 54, where the dirt cup 54 forms a portion of the cyclone separator 18. Examples of this type of separator are disclosed in U.S. Pat. Nos. 6,003,196 and 6,607,572, which are incorporated herein by reference in their entirety. In such an embodiment, the cyclone separator assembly 12 can comprise a bottom wall that also forms the bottom walls of the fine particle collectors 104 and that can be displaced, such as by pivoting, relative to the cyclone separator assembly 12 to thereby empty the fine particle collectors 104.

Figure 10:
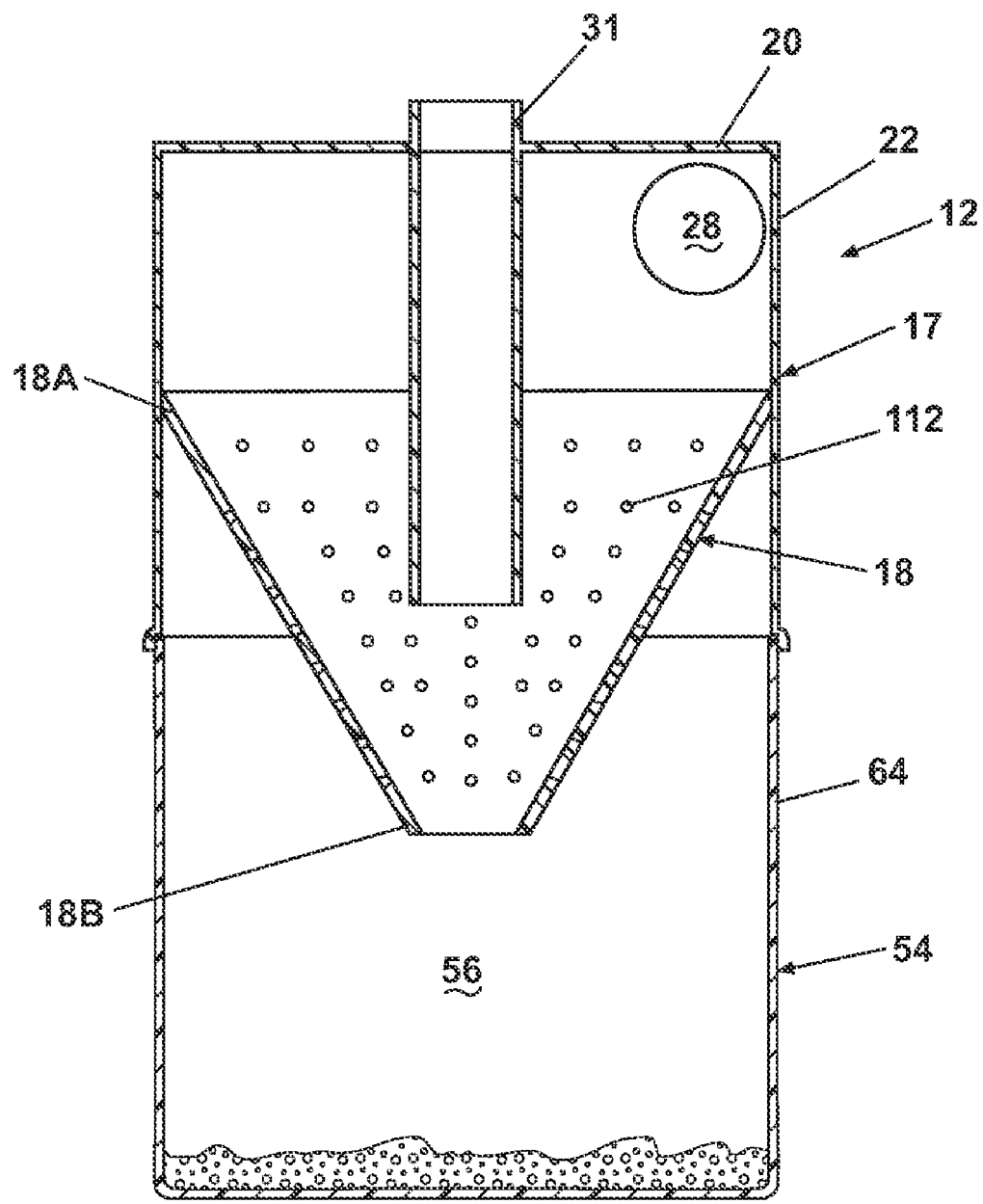
FIG. 10 is a schematic sectional view of a third embodiment cyclone separator assembly according to the invention.

A third embodiment of a cyclone separator assembly 12 is illustrated in FIG. 10, where components similar to those of the first and the second embodiment cyclone separator assemblies 12 are identified with the same reference numeral. The cyclone separator assembly 12 comprises an upper housing 17 with a top wall 20 and a cylindrical sidewall 22 having a tangential air inlet 28 formed therein and a dirt cup 54 sealingly mounted to the upper housing 17. A generally frustoconical cyclone separator 18 located within the cyclone separator assembly 12 comprises an upper end 18A, a lower end 18B, and a plurality of apertures 112 sized to receive fine particles of dirt. An exhaust outlet 31 that extends from the cyclone separator 18 through the top wall 20 of the upper housing 17 is in fluid communication with a source of suction (not shown).

During operation of the cyclone separator assembly 12, dirt-laden air flows into the cyclonic separator assembly 12 through the tangential air inlet 28 and flows in a cyclonic fashion along the cyclone separator 18 from the upper end 18A, to the lower end 18B, and through the exhaust outlet 31. As the air flows from the upper end 18A to the lower end 18B, large particles of dirt are separated from the airstream and are thrown out of the cyclone separator 18 at the lower end 18B and into the dirt cup 54. At the same time, the cyclone separator 18 also functions as a fine particle separator as the airstream flows from the upper end 18A to the lower end 18B. In particular, as the airstream passes by the apertures 112, the fine particles of dirt drop out of the airstream and travel through the apertures 112 and into the dirt cup 54. As a result, both the large and fine particles are collected in the dirt cup 54 and can be emptied by removing the dirt cup 54 from the cyclone separator assembly 12.

Figure 11:
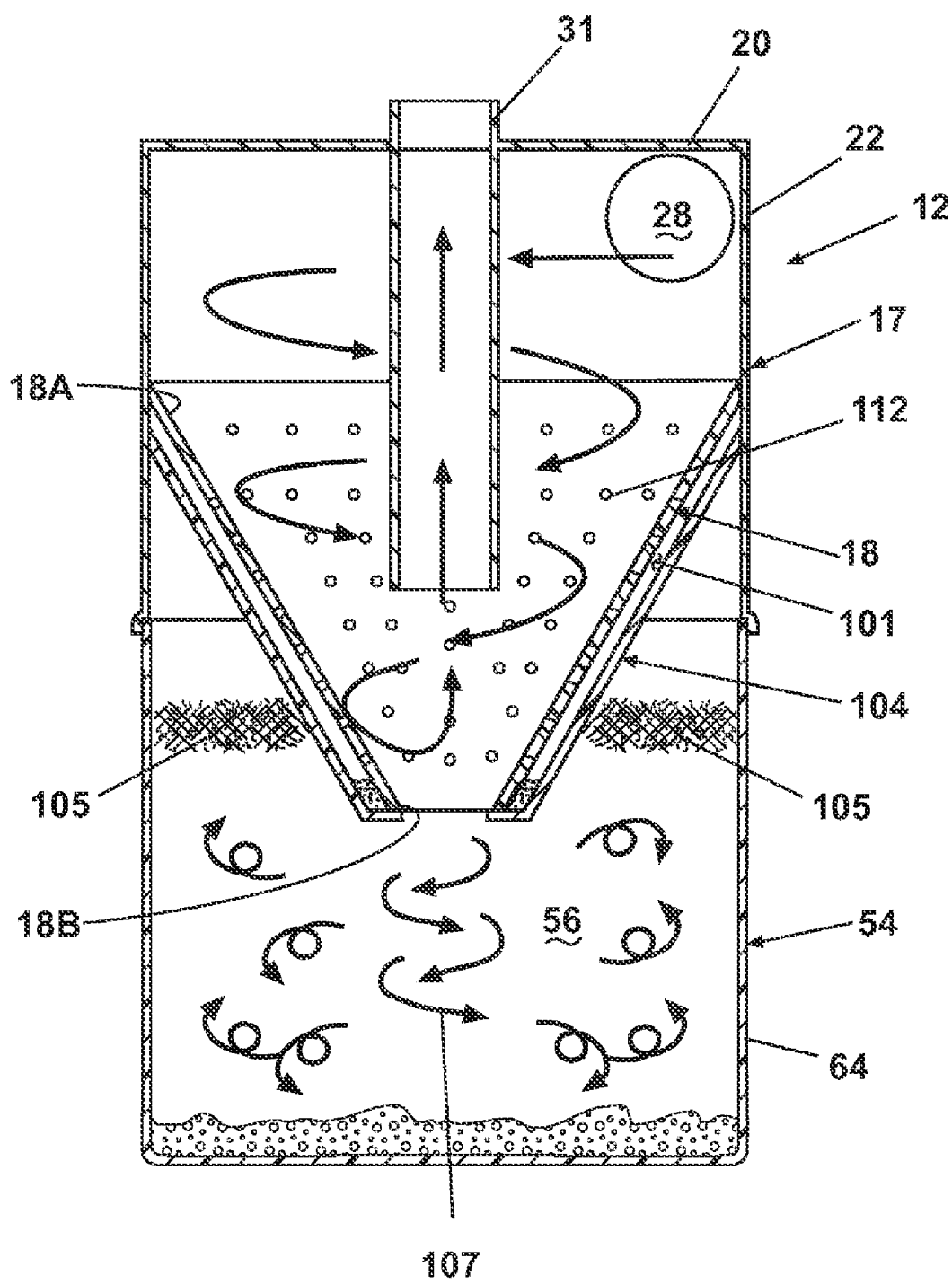
FIG. 11 is a schematic sectional view of the cyclone separator assembly of FIG. 10 with a fine particle collector mounted to a frustoconical cyclone separator.

Alternatively, the cyclone separator assembly 12 can comprise a unitary housing that can be removed from the vacuum cleaner 10 as a single entity. In such an embodiment, the cyclone separator assembly 12 can comprise a bottom wall that can be displaced from the cyclone separator 12 to thereby empty the large and fine particles. In another alternative embodiment, as illustrated in FIG. 11, the cyclone separator assembly 12 can further comprise a fine particle collector 104 sealingly mounted to the cyclone separator 18 to form a small dead space around the cyclone separator 18 for receiving the fine particles that pass through the apertures 112. When the cyclone separator assembly 12 comprises a separate and removable dirt cup 54, the fine particle collector 104 can be removed with the dirt cup 54 for emptying.

Three levels of filtration can occur in the embodiment shown in FIG. 11. As previously described, bulk separation of larger particles occurs through centrifugal action within the cyclone separator 18, and the larger particles are dropped into the dirt cup 54. At the same time, the fine particles pass through the apertures 112 and are captured in the fine particle collector 104. However, the larger particles can comprise both heavy particles and lighter fluff 105 including carpet fibers, hair strands, dust balls, and the like. As shown by arrows, airflow through the cyclone separator 18 creates a vortex tail 107 that can extend through the lower end 18B and randomly move around within the dirt cup 54. The swirling air within the dirt cup 54 can create an induced vortex in the dirt cup 54 whereby the vortex tail 107 induces circular airflow about the sidewall 64 of the dirt cup 54. This induced vortex can further create a turbulent layer near the top of the dirt cup 54 outside the fine particle collector 104. The lighter fluff 105 tends to be lifted by the turbulent air flow and circulates around the exterior of the fine particle collector 104 and above the lower end 18B of the cyclone separator 18, which effectively prevents re-entrainment. The lighter fluff 105 remains in suspension until the airflow is stopped, at which time the lighter fluff 105 falls under force of gravity to the bottom of the dirt cup 54. Thereafter, the lighter fluff 105 can be emptied with the other contents in the dirt cup 54. As can be appreciated, separation of the lighter fluff 105 can occur with a frustoconical cyclone separator 18 lacking the fine particle collector 104, as long as the dirt cup 54 extends above the lower end 18B of the frustoconical cyclone separator 18, with or without the apertures 112, as depicted in FIG. 12.

Figure 12:
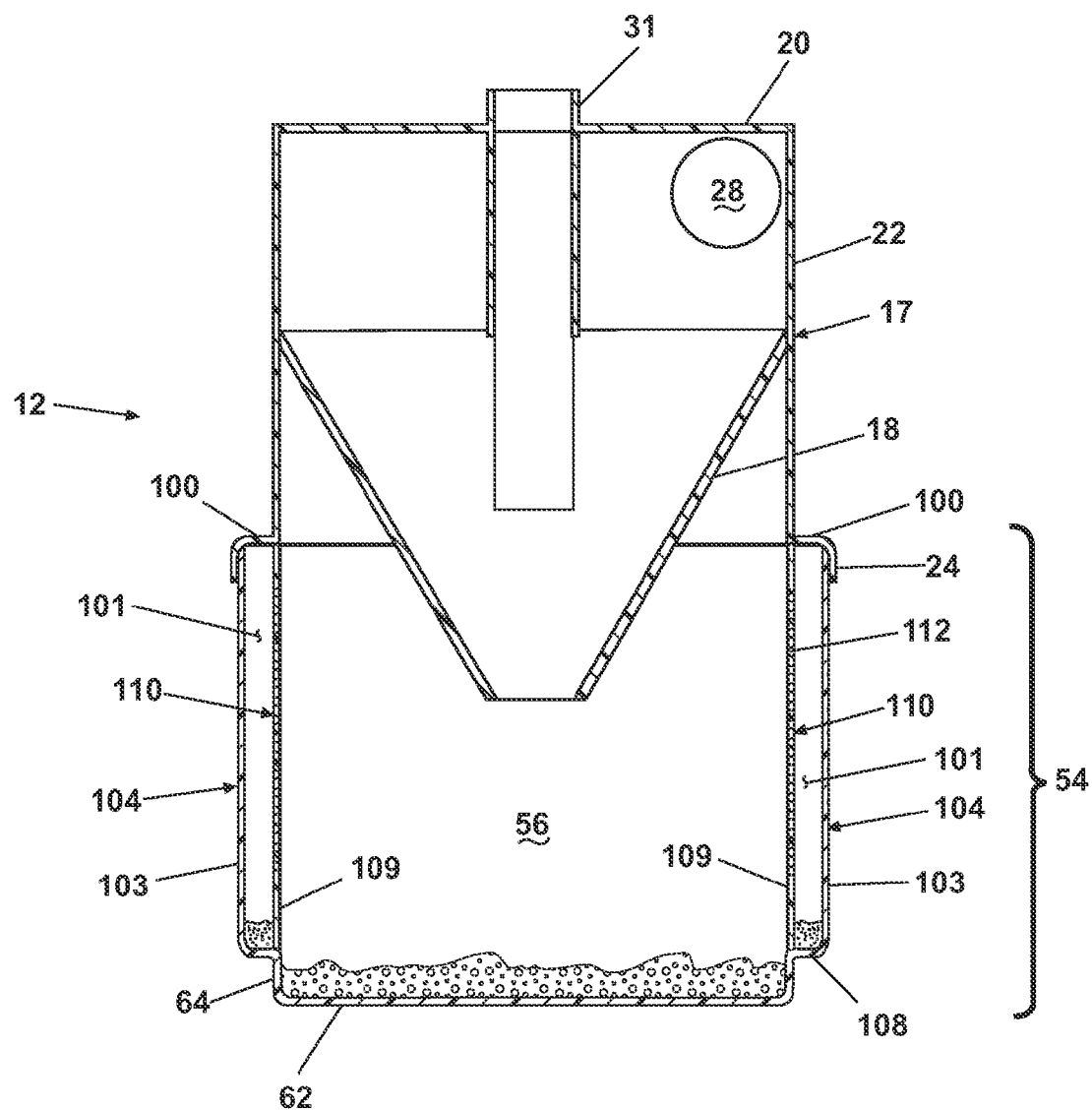
FIG. 12 is a schematic sectional view of a fourth embodiment cyclone separator assembly according to the invention.

A fourth embodiment of a cyclone separator assembly 12 is illustrated in FIG. 12 where components similar to those of previous embodiment cyclone separator assemblies 12 are identified with the same reference numeral. The cyclone separator assembly 12 comprises an upper housing 17 with a top wall 20 and a cylindrical sidewall 22 having a tangential air inlet 28 and a dirt cup 54 sealingly mounted to the upper housing 17. The dirt cup 54 comprises a bottom wall 62 and a sidewall 64 extending upward from the bottom wall 64. A generally frustoconical cyclone separator 18 located within the cyclone separator assembly 12 comprises an upper end 18A and a lower end 18B, and an exhaust outlet 31 that extends from the cyclone separator 18 through the top wall 20 of the upper housing 17 is in fluid communication with a source of suction (not shown). The cyclone separator assembly 12 further comprises fine particle collectors 104 formed in the side wall 64 of the dirt cup 54 in the same manner as in the first embodiment cyclone separator assembly 12 of FIGS. 1-6.

During operation of the cyclone separator assembly 12, dirt-laden air flows into the cyclonic separator assembly 12 through the tangential air inlet 28 and flows in a cyclonic fashion along the cyclone separator 18 from the upper end 18A, to the lower end 18B, and through the exhaust outlet 31. As the air flows from the upper end 18A to the lower end 18B, large particles of dirt are separated from the airstream and are thrown out of the cyclone separator 18 at the lower end 18B and into the dirt cup 54. Air entrained with fine particles enters the dirt cup 54 with the large particles, and inertia carries the entrained fine particles of dirt toward the dirt cup sidewall 64 and, thus, the fine particle separation members 110. As the air passes over the fine particle separation members 110, the inertia of the fine particles throws the fine particles through the plurality of apertures 112 in the fine particle separation members 110. After passing through the apertures 112, the fine particles come to rest in the relatively dead space within the fine particle collection chambers 101 of the fine particle collectors 104.

Figure 13:
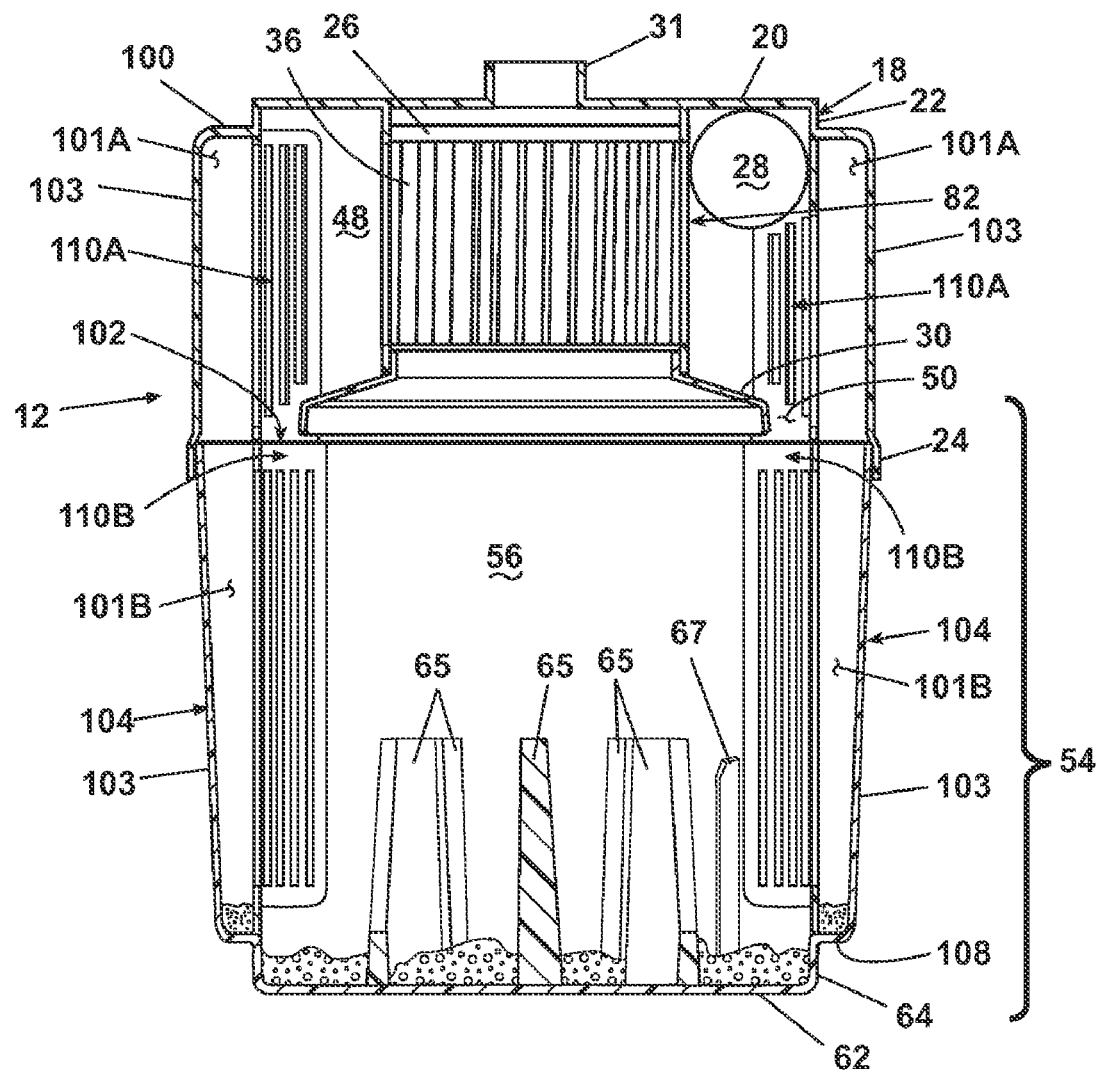
FIG. 13 is a schematic sectional view of a fifth embodiment cyclone separator assembly according to the invention.

A fifth embodiment of a cyclone separator assembly 12 is illustrated in FIG. 13 where components similar to those of previous embodiment cyclone separator assemblies 12 are identified with the same reference numeral. The cyclone separator assembly 12 is identical to the first embodiment cyclone separator assembly 12 of FIGS. 1-6, except that in the current embodiment, the fine particle collectors 104 span both the cyclone separator 18 and the dirt cup 54. Each of the fine particle collectors 104 comprises an upper fine particle separation member 110A and a lower fine particle separation member 110B. The upper fine particle separation member 110A forms an effectively continuous wall with the sidewall 22 of the cyclone separator 18, and the lower fine particle separation member 110B forms an effectively continuous wall with the sidewall 64 of the dirt cup 54. Alternatively, the fine particle separation members 110A, 110B can be formed integrally with the respective sidewalls 22, 64. Additionally, each fine particle collector 104 forms an open-bottom upper fine particle collection chamber 101A adjacent to the upper fine particle separation member 110A and an open-top lower fine particle collection chamber 101B adjacent the lower fine particle separation member 110B. The upper and lower fine particle collection chambers 101A, 101B are joined to form a single fine particle collection chamber 101 when the dirt cup 54 is mounted beneath the cyclone separator 18, as shown in FIG. 13.

Figure 14:
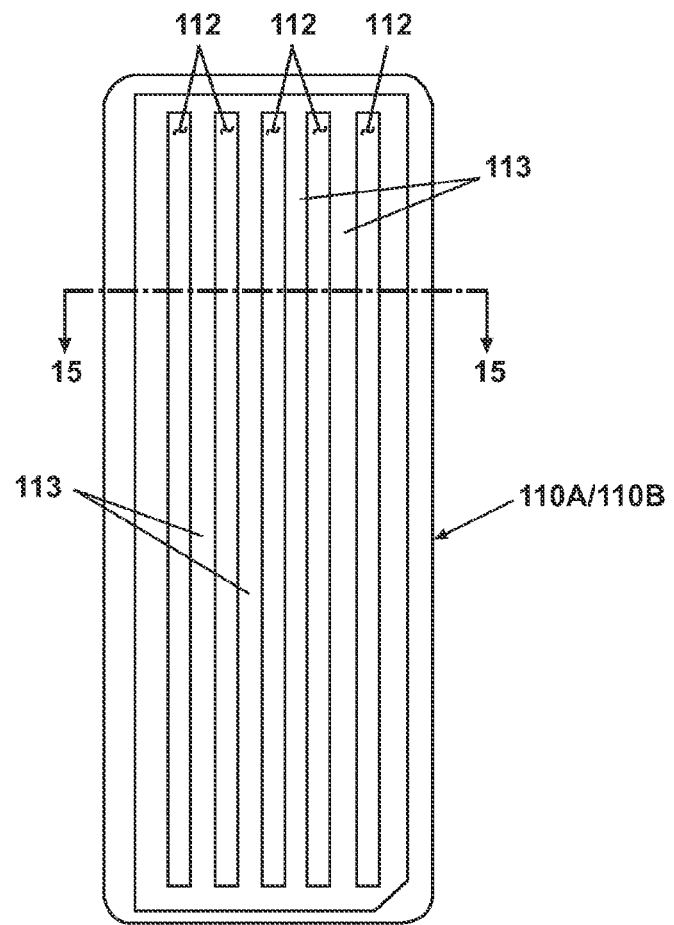
FIG. 14 is a front view of a fine particle separator member from the cyclone separator assembly of FIG. 13.
Figure 15:
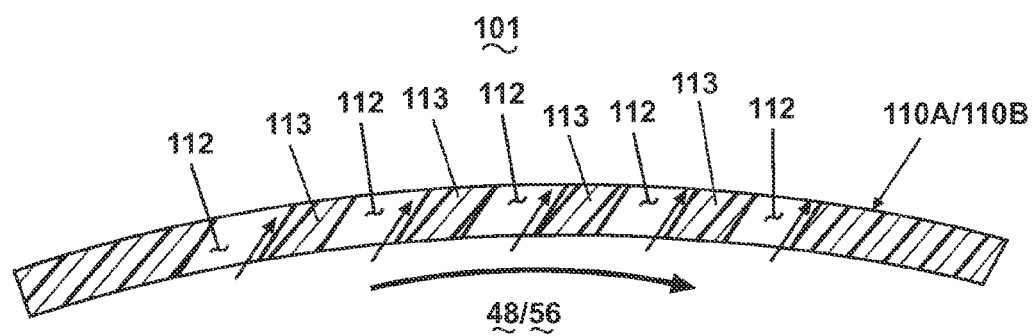
FIG. 15 is a sectional view taken along line 15-15 of FIG. 14.
Figure 16:
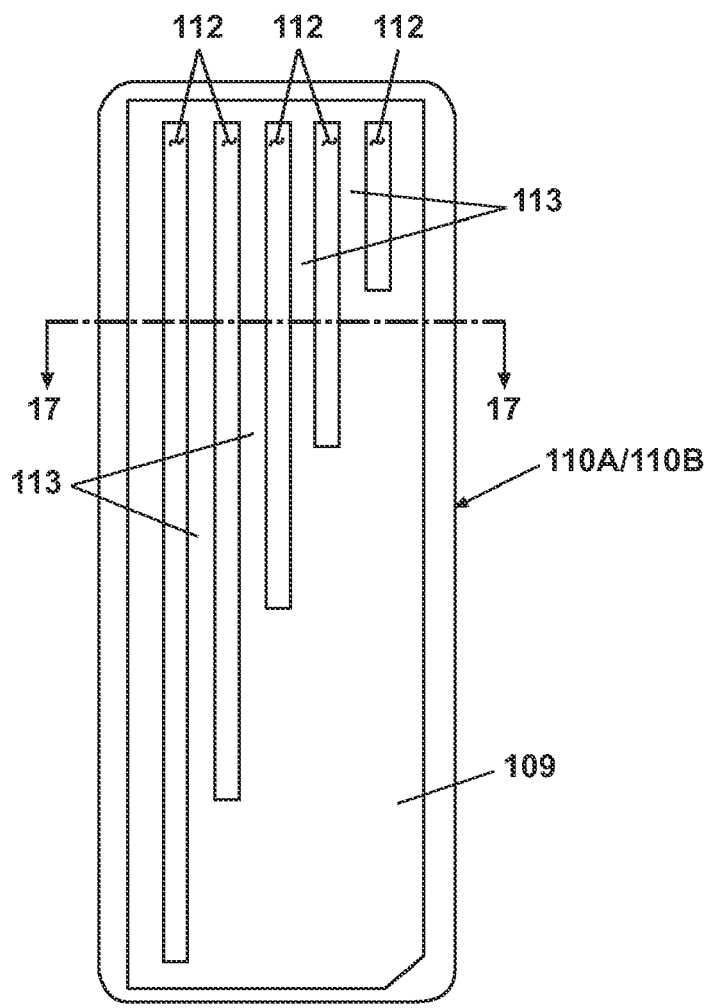
FIG. 16 is a front view similar to FIG. 14 of an alternative fine particle separation member.
Figure 17:
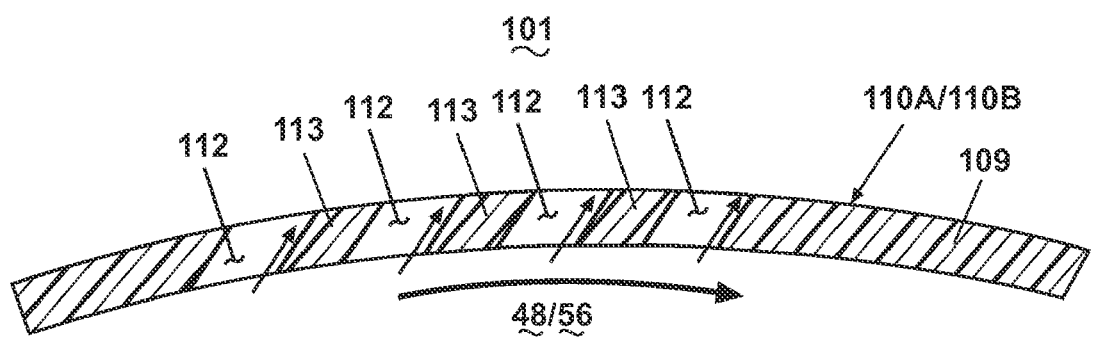
FIG. 17 is a sectional view taken along line 17-17 of FIG. 16.

Another difference between the cyclone separator assembly 12 of FIG. 13 and the first embodiment cyclone separator 12 (FIGS. 1-6) is the geometry of the apertures 112 in the fine particle separation members 110. In the current embodiment, the fine particle separation members 110, which are best viewed in FIG. 14, comprise a plurality of vertical louvers 113 that form the apertures 112 therebetween. Thus, the apertures 112 are elongated vertical slots, and, as best seen in FIG. 15, the slots are angled so that they are parallel or in-line with the airstream. The slots can extend uniformly along the height of the fine particle separation member 110, or the slots can have variable height and surface area, as shown in FIGS. 16 and 17. The slots of the fine particle separation member 110 of FIGS. 16 and 17 have a stepped configuration or gradually decrease in height or surface area from the upstream side to the downstream side such that the apertures 112 and the solid wall portion 109 meet at a generally diagonal juncture similar to the fine particle separation members 110 of the first embodiment in FIGS. 1-6.

During operation, a working airstream enters and flows through the cyclone separation assembly 12 as described above with respect to the first embodiment cyclone separation assembly 12 in FIGS. 1-6; however, fine particles are separated from the airstream in the cyclone separator 18 through the upper fine particle separation members 110A as well as in the dirt cup 54 through the lower fine particle separation members 110B. The fine debris that passes through the upper fine particle separation member 110A enters the upper fine particle collection chamber 101A and falls into the lower fine particle collection chamber 110B, and the fine debris that passes through the lower fine particle separation member 110B enters the lower fine particle collection chamber 101B. Thus, the fine debris, whether separated in the cyclone separator 18 or the dirt cup 54 falls under force of gravity to the closed bottom 108 of the fine particle collectors 104. Debris in the fine particle collectors 104 and in the dirt cup 54 can be emptied by removing the dirt cup 54 and thereby the portion of the fine particle collectors 104 that forms the lower fine particle collection chambers 101B from the cyclone separator assembly 12.

Figure 18:
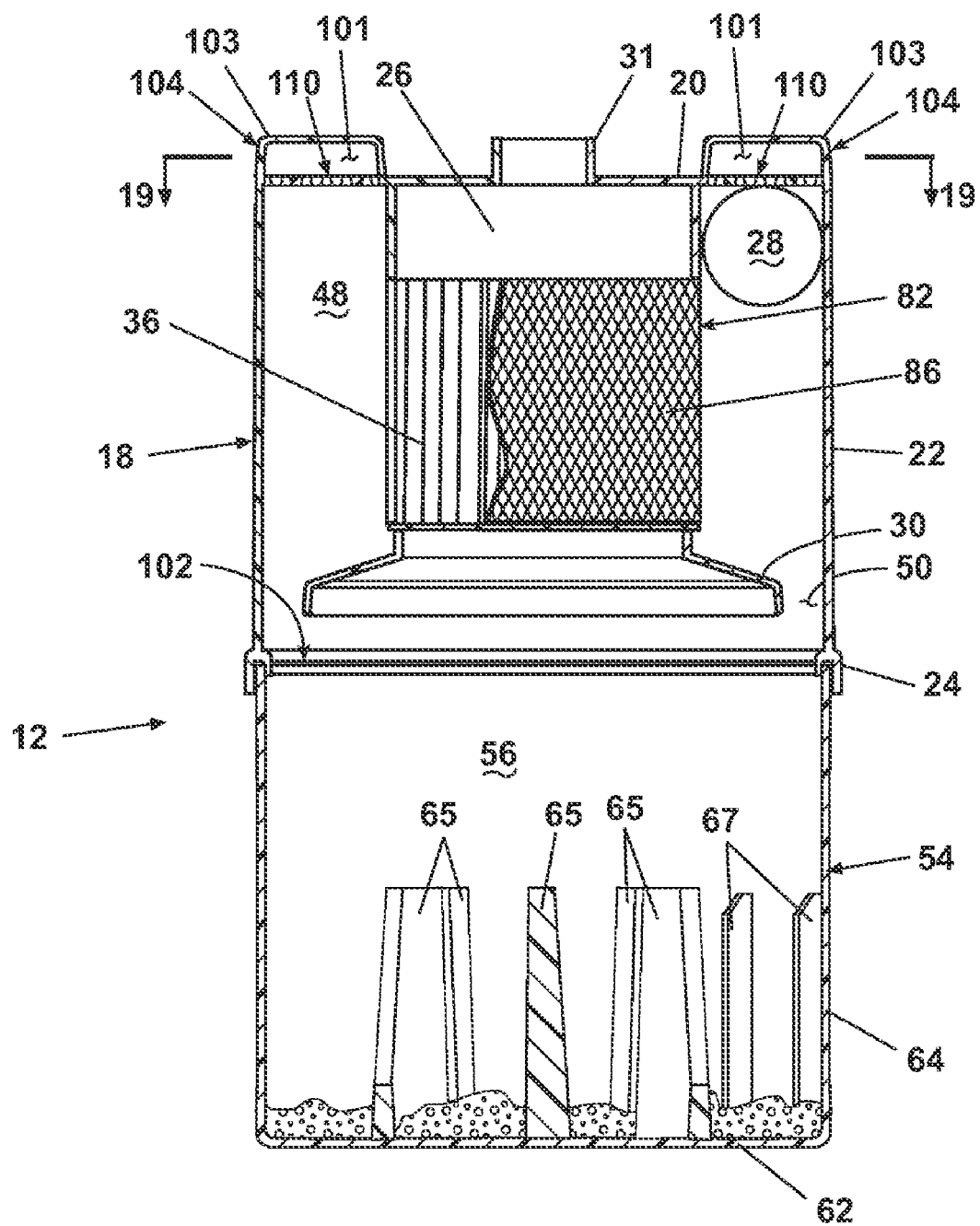
FIG. 18 is a schematic sectional view of a sixth embodiment cyclone separator assembly according to the invention.
Figure 19:
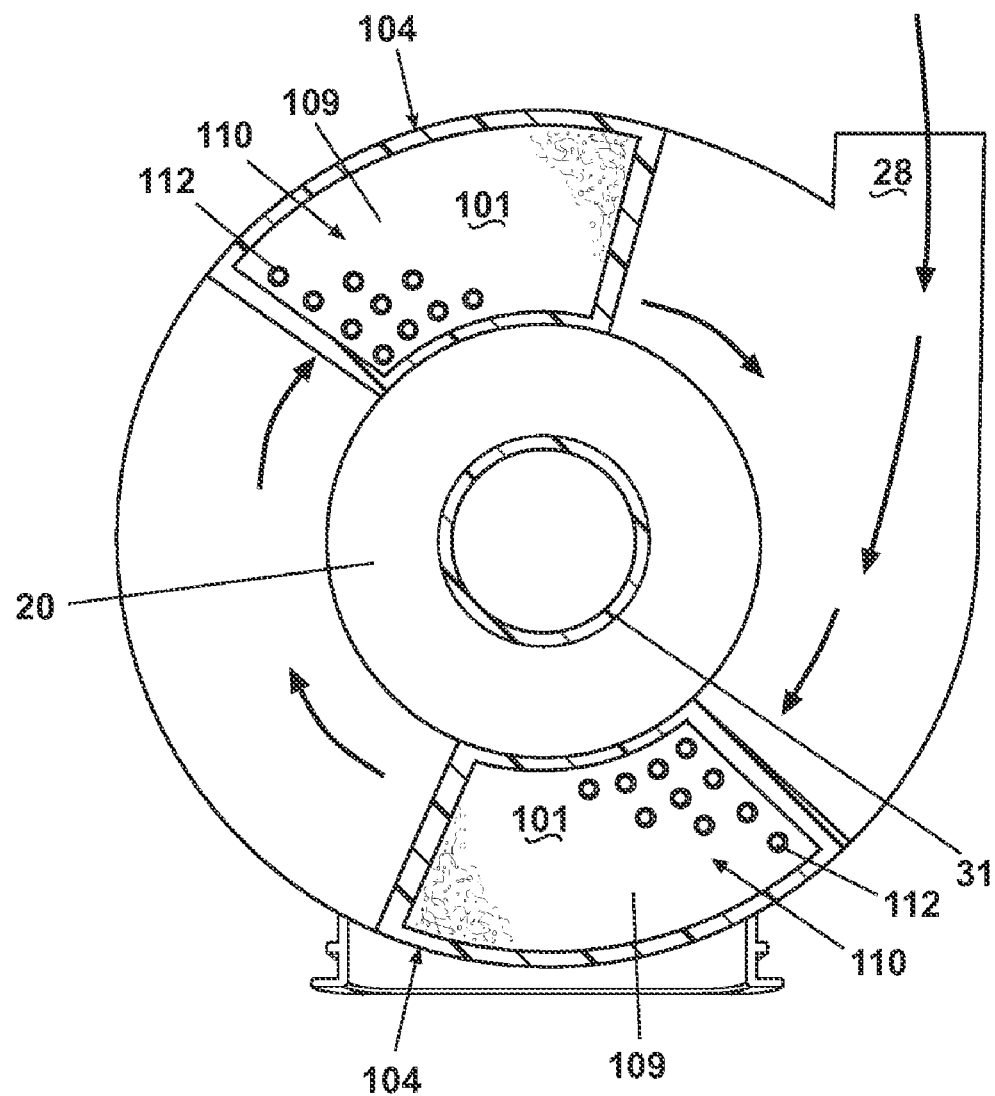
FIG. 19 is a sectional view taken along line 19-19 of FIG. 18.

A sixth embodiment of a cyclone separator assembly 12 is illustrated in FIGS. 18 and 19, where components similar to those of previous embodiment cyclone separator assemblies 12 are identified with the same reference numeral. The cyclone separator assembly 12 is identical to the first embodiment cyclone separator assembly 12 of FIGS. 1-6, except that in the current embodiment, the fine particle collectors 104 are formed in the cyclone top wall 20. The fine particle separation members 110 are separate pieces that form an effectively continuous wall with the cyclone top wall 20. Alternatively, the fine particle separation members 110 can be integrally formed with the cyclone top wall 20.

During operation, a working airstream enters the toroidal chamber 48 of the cyclone separator 18 through the tangential air inlet 28. As the airstream flows around the toroidal chamber 48, fine particles entrained in the airstream are separated by the fine particle separation members 110 and enter the fine particle collection chambers 101, where the fine particles collect above the solid wall portions 109 of the fine particle separation members 110.

Figure 20:
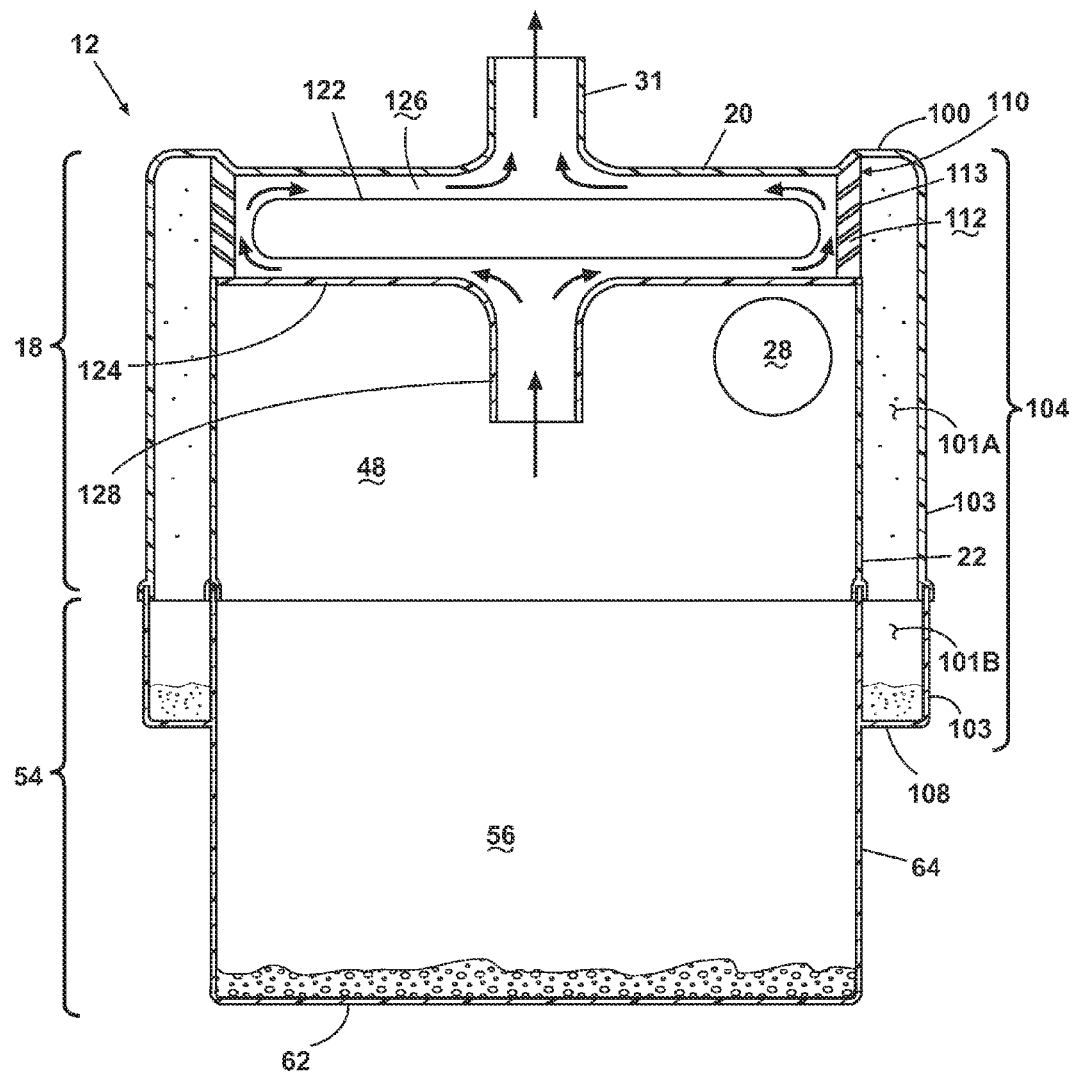
FIG. 20 is a schematic sectional view of a seventh embodiment cyclone separator assembly according to the invention.
Figure 21:
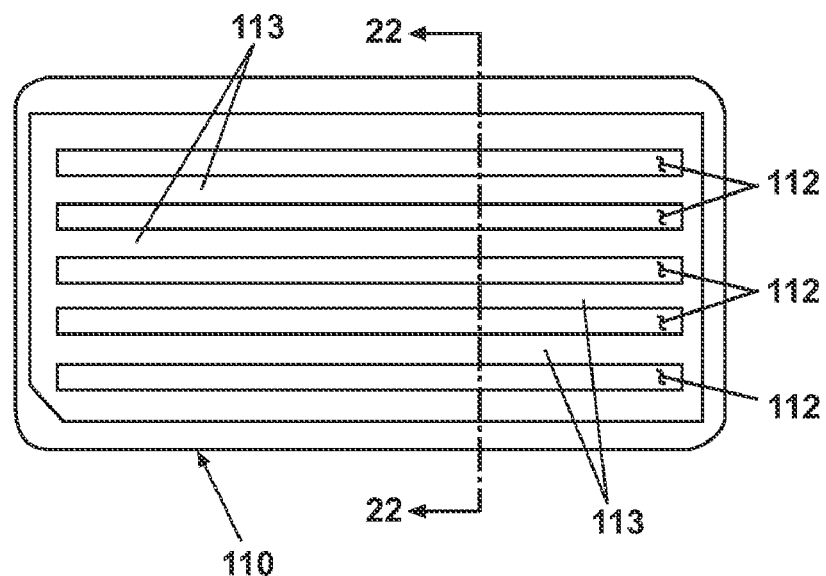
FIG. 21 is a front view of a fine particle separator member from the cyclone separator assembly of FIG. 20.
Figure 22:
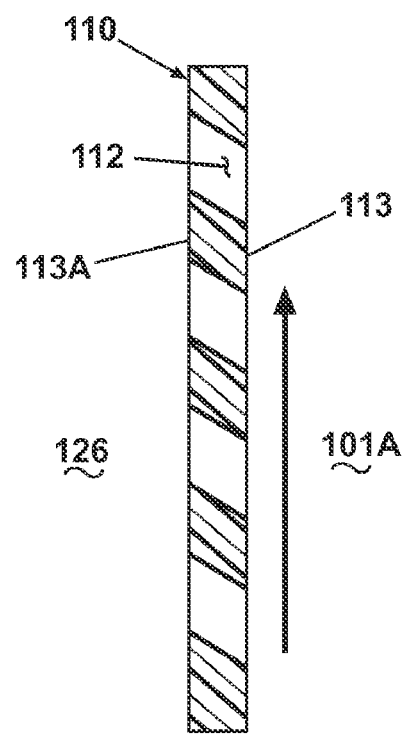
FIG. 22 is a sectional view taken along line 22-22 of FIG. 21.

A seventh embodiment of a cyclone separator assembly 12 is illustrated in FIGS. 20-22, where components similar to those of previous embodiment cyclone separator assemblies 12 are identified with the same reference numeral. Referring to FIG. 20, the cyclone separator assembly 12 is similar to the first embodiment cyclone separator assembly 12 of FIGS. 1-6, except that in the current embodiment, the fine particle collectors 104 span both the cyclone separator 18 and the dirt cup 54 and the cyclone separator assembly 12 further comprises a guide plate 122 that functions to create a direction change in the airstream flow path for aiding in the separation of fine particles from the airstream.

Like the fifth embodiment illustrated in FIG. 13, each fine particle collector 104 comprises an open-bottom upper fine particle collection chamber 101A adjacent the cyclone separator sidewall 22 and an open-top lower fine particle collection chamber 101B adjacent the dirt cup sidewall 64 and the fine particle separation member 110, which forms an effectively continuous side wall with the separator sidewall 22. Alternately, the fine particle separation member 110 can be formed integrally with the side wall 22. The upper and lower fine particle collection chambers 101A, 101B are joined to form a single fine particle collection chamber 101 when the dirt cup 54 is mounted beneath the cyclone separator 18, as shown in FIG. 20. Alternately, the fine particle collectors 104 can span only the cyclone separator 18.

The cyclone separator 18 further comprises a separation wall 124 formed in spaced relation to the top wall 20, thereby forming a lower wall of a outlet chamber 126 in which the guide plate 122 is positioned. The separation wall 124 is substantially imperforate, except for an outlet chamber inlet 128 which fluidly communicates the toroidal chamber 48 with the outlet chamber 126. The outlet chamber 126 essentially forms the outlet of the toroidal chamber 48. Thus, while the separation wall 124 generally separates the fine particle collection chambers 101 from the toroidal chamber 48, the two spaces communicate through the outlet chamber 126. The outlet chamber 126 can be rectangular or any other geometry suitable for airflow therethrough.

As described above, the top wall 20 and the separation wall 124 forms an upper wall and a lower wall of the outlet chamber 126, respectively. The side wall of the outlet chamber 126 is formed by the separator side wall 22 and the fine particle separation members 110. The fine particle separation members 110 separate the upper fine particle collection chambers 101A from the outlet chamber 126, though the two spaces communicate through apertures 112 in the fine particle separation members 110. Thus, fine particles entrained in the air in the outlet chamber 126 can pass through the apertures 112 to the fine particle collection chambers 101.

The guide plate 122 is positioned in the outlet chamber 126 so that air can flow in through the outlet chamber inlet 128 and out through the exhaust outlet 31. Preferably, the guide plate 122 is positioned in the outlet chamber 126 so that it is spaced from the top wall 20, the separation wall 124, the separator sidewall 22 and the fine particle separation members 110. Although not shown, fixation devices can extend between the guide plate 122 and the top wall 20 or the separation wall 124 to maintain the guide plate 122 in its spaced position. The type and manner of fixation is not germane to the invention, as long as air can flow between the outlet chamber inlet 128 and the exhaust outlet 31.

As illustrated, the guide plate 122 comprises a solid disc, although other configurations are possible. The guide plate 122 functions to aid in the separation of fine particles entrained in the air flowing through the outlet chamber 126 by directing the airstream entering the outlet chamber inlet 128 radially outwardly, and then radially inwardly, essentially changing the direction of the airstream flow path 180°, before exiting the cyclone separator assembly 12 through the exhaust outlet 31. The inertia of the fine particles entrained in the airstream causes them to continue traveling radially outwardly even after the airstream changes direction, whereby the fine particles are carried into the fine particle collectors 104. The width of the guide plate 122 causes the airstream flow path to be directed vertically for a short time after flowing radially outwardly and before flowing radially inwardly. The width of the guide plate 122, and thus the vertical component of the airstream flow path through the outlet chamber 126, can vary, as long as the effect on fine particle separation remains negligible.

As with previous embodiments, the apertures 112 in the fine particle separation members 110 can be configured in any suitable geometry. However, as shown in FIGS. 21 and 22, it is preferred that the apertures 112 are formed by a plurality of horizontal louvers 113 such that the apertures 112 are elongated, horizontal slots. As shown in FIG. 22, the slots can be angled so that they are parallel or in-line with the airstream. It is further preferred that the leading edge or surface of the apertures 112 be transverse to the airstream flow path. It is more preferred that the leading edge or surface of the apertures 112 be generally perpendicular to the airstream flow path. Thus, in the current embodiment, the leading surface 113A of the louvers 113, and thus the leading edge of the apertures 112, are oriented generally horizontally, since the airstream flow path past the fine particle separation members 110 is generally vertical.

In another example (not shown), the apertures 112 can have a truncated cone shape, as described in the first embodiment and shown in FIG. 3A. The apertures 112 will be oriented so that the central axis of the truncated cone is transverse to the flow direction of the airstream passing the apertures 112.

While not shown, it is understood that the seventh embodiment of the cyclone separator 18 can comprise a filter assembly, similar to the filter assembly 82 shown in FIGS. 1-6, or a frustoconical separator, similar to the frustoconical separators 18 shown in FIGS. 10-12, and the dirt cup 54 can comprise a plurality of finger-like projections extending vertically from the bottom wall 62 of the dirt cup 54, similar to the projections 65 shown in FIGS. 1-6.

During operation, the working airstream enters the tangential air inlet 28 and flows in a cyclonic fashion around the sidewall 22. As the air circulates, larger particles entrained in the airstream are separated therefrom and fall to the bottom of the dirt cup 54. The airstream remains entrained with fine particles and passes into the outlet chamber 126 through the outlet chamber inlet 128. In the outlet chamber 126, the airstream encounters the guide plate 122, which forces the airstream, in sequence, radially outwardly, vertically, and radially inwardly, thereby essentially changing the flow direction of the airstream 180°. As the airstream changes direction, the inertia of the fine particles throws the fine particles through the plurality of apertures 112 in the fine particle separation members 110. After passing through the apertures 112, the fine particles come to rest in the relatively dead space within the fine particle collection chambers 101 of the fine particle collectors 104.

Figure 23:
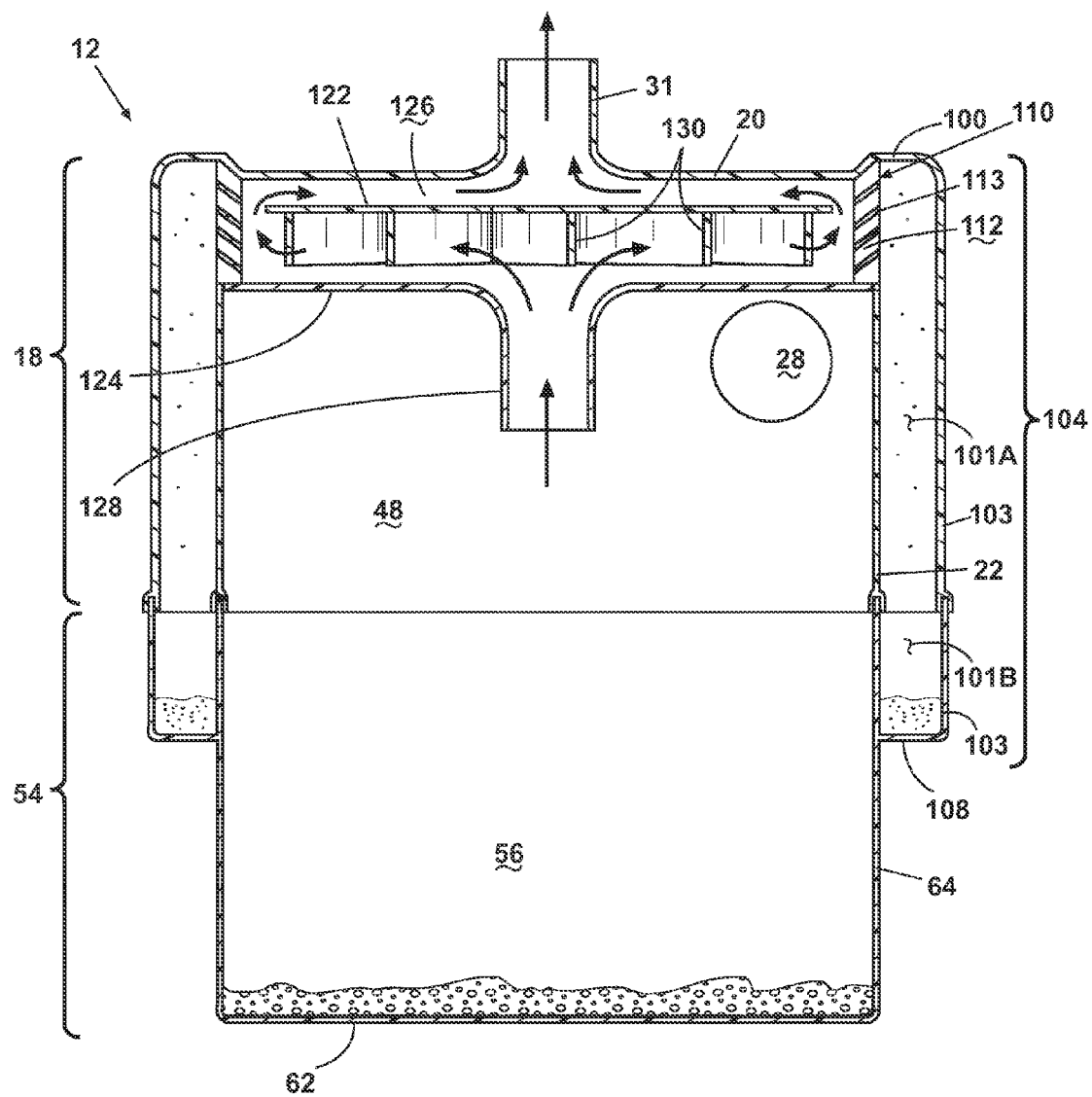
FIG. 23 is a schematic sectional view of an eighth embodiment cyclone separator assembly according to the invention.
Figure 24:
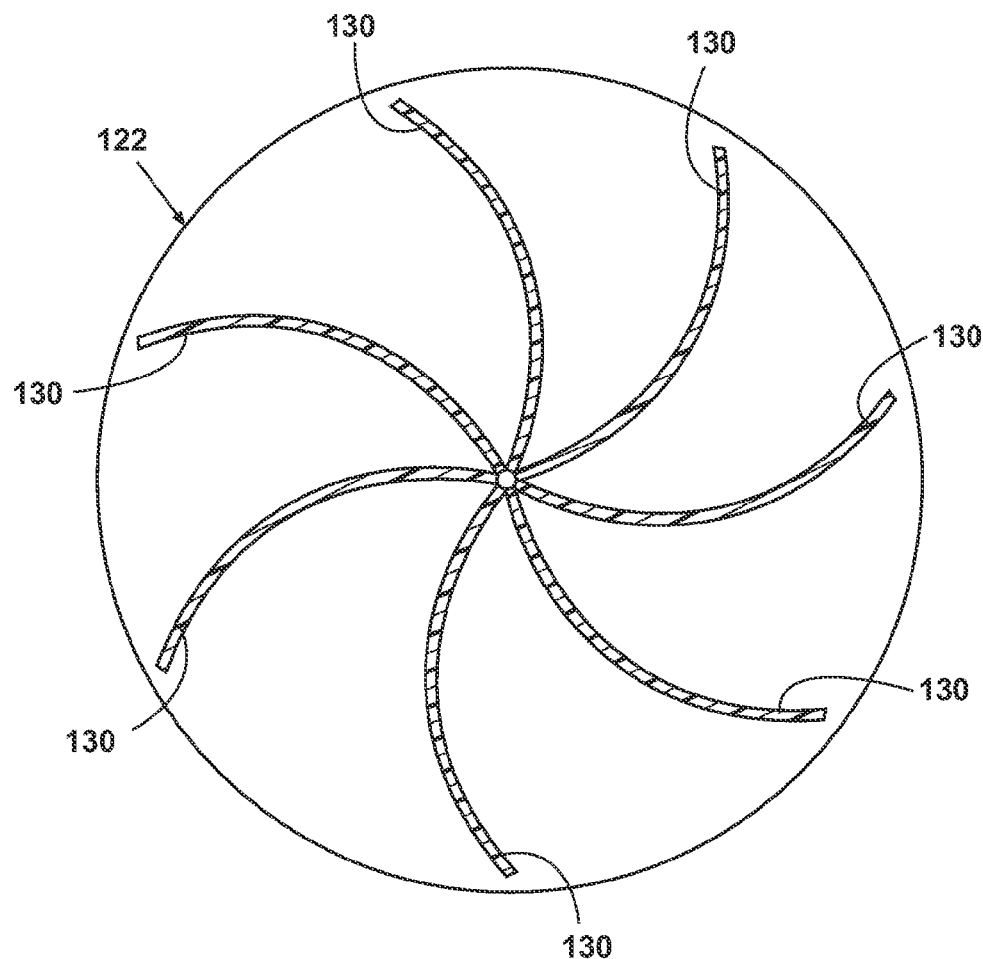
FIG. 24 is a bottom view of a guide plate from the cyclone separator assembly of FIG. 23.
Figure 25:
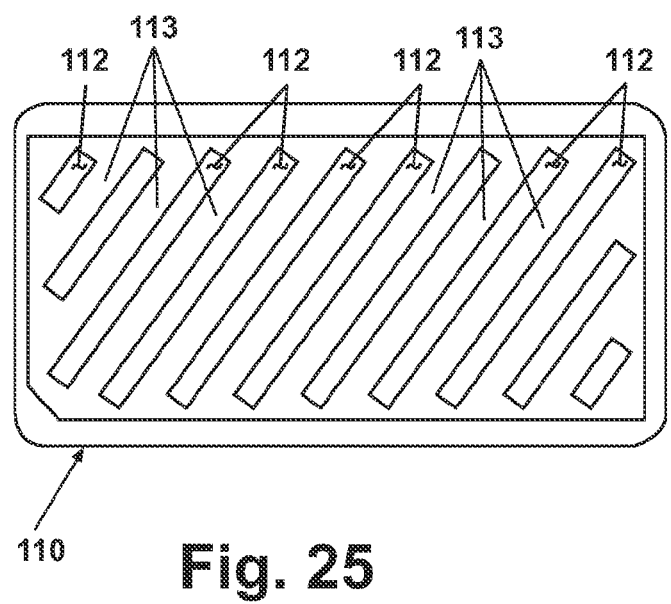
FIG. 25 is a front view of a fine particle separator member from the cyclone separator assembly of FIG. 23.

An eighth embodiment of a cyclone separator assembly 12 is illustrated in FIGS. 23-25, where components similar to those of previous embodiment cyclone separator assemblies 12 are identified with the same reference numeral. The cyclone separator assembly 12 is identical to the seventh embodiment cyclone separator assembly 12 of FIG. 20 except that in the current embodiment, the guide plate 122 comprises a fan-like formation on the bottom surface of the guide plate 122. The formation comprises a plurality of spaced, curved vanes 130 extending radially outwardly from the center of the guide plate 122, as shown best in FIG. 24. The vanes 130 function to direct air centrifugally outwardly, in a circular pattern; thus, the air flowing through the outlet chamber 126 is directed centrifugally outwardly, and then radially inwardly, essentially changing the direction of the airstream flow path 180°, before exiting the cyclone separator assembly 12 through the exhaust outlet 31. The inertia of the fine particles entrained in the airstream causes them to continue traveling centrifugally outwardly even after the airstream changes direction, whereby the fine particles are carried into the fine particle collectors 104. Alternatively, the guide plate 122 can be mounted to spin as the air flows through the vanes 130 to further increase the inertia of the particles in the airstream. Like the seventh embodiment, the width of the guide plate 122 also causes the airstream flow path to be directed vertically for a short time after flowing centrifugally outwardly and before flowing radially inwardly.

Another difference between the current embodiment and the cyclone separator assembly 18 of FIG. 20 is the configuration of the apertures 112. As best viewed in FIG. 24, since the airstream flow path past the fine particle separation members 110 contains both horizontal and vertical components, the apertures 112 are formed by a plurality of canted louvers 113 such that the apertures 112 are elongated, canted slots.

In another example (not shown), since the airstream flow path past the fine particle separation members 110 is more horizontal than vertical, the louvers 113 can be oriented generally vertically, as described for the fifth embodiment of the cyclone separator assembly 18 and shown in FIG. 13.

During operation, the working airstream enters the tangential air inlet 28 and flows in a cyclonic fashion around the sidewall 22. As the air circulates, larger particles entrained in the airstream are separated therefrom and fall to the bottom of the dirt cup 54. The airstream remains entrained with fine particles and passes into the outlet chamber 126 through the outlet chamber inlet 128. In the outlet chamber 126, the airstream encounters the guide plate 122, and the vanes 130 on the guide plate 122 forces the airstream, in sequence, centrifugally outwardly, vertically, and radially inwardly, thereby essentially changing the flow direction of the airstream 180°. As the airstream changes direction, the inertia of the fine particles throws the fine particles through the plurality of apertures 112 in the fine particle separation members 110. After passing through the apertures 112, the fine particles come to rest in the relatively dead space within the fine particle collection chambers 101 of the fine particle collectors 104.

The multiple embodiments of the cyclone separator assembly 12 comprise a fine particle separation member having a plurality of apertures for separating fine particles from a working airstream. Examples of the fine particle separation member include, but are not limited to, a frustoconical cyclone separator, a cylindrical cyclone separator, and a wall portion of a dirt cup or a cyclone region. The fine particle separation member can be in a sidewall of any cyclone, regardless of shape or orientation, and the apertures should be positioned to follow the cyclone path as it descends down the side wall. Alternatively, the apertures can be formed in an upper wall of a cyclone. Because the fine particle separation member is formed in a sidewall or upper wall, large particles do not obstruct the apertures as the large particles are separated from the working airstream. As a result, the fine particle separation member is effective regardless of the amount of large particles in the dirt collection chamber. Additionally, the particle separation member can be positioned between a cyclonic area and a dead space within the fine particle collector. Optionally, the fine particle separator dead space can be formed as a handle for removing the cyclone separator assembly or a portion thereof from the vacuum cleaner.

While the invention has been specifically described in connection with certain specific embodiments thereof, it is to be understood that this is by way of illustration and not of limitation. Reasonable variation and modification are possible within the forgoing disclosure and drawings without departing from the spirit of the invention, which is defined in the appended claims.

What is claimed is:

1. A vacuum cleaner comprising:
    a housing having a sidewall and a top wall defining a cyclonic airflow chamber for separating contaminants from a dirt-containing airstream, the housing further comprising an inlet and an outlet with an outlet wall in fluid communication with the cyclonic airflow chamber, and, optionally, a dirt cup with a sidewall, and an opening in at least one of the housing sidewall, the top wall, dirt cup wall and the outlet wall;
    a nozzle housing including a main suction opening, the main suction opening being fluidly connected with the housing inlet;
    an airstream suction source fluidly connected to the main suction opening and to the cyclonic airflow chamber for transporting dirt-containing air from the main suction opening to the cyclonic airflow chamber, wherein the suction source is adapted to establish and maintain the dirt-containing airstream from the main suction opening to the housing inlet;
    a fine contaminant collector positioned in registry with the opening in at least one of the housing sidewall, the top wall, the dirt cup sidewall and the wall of the outlet and formed at least in part by at least one collector side wall and a bottom wall which define a collection chamber that opens into the at least one of the cyclonic airflow chamber, the dirt cup, and the housing outlet; and
    a fine contaminant separation member closing the opening in the at least one of the housing sidewall, the top wall, dirt cup wall and outlet wall to separate the collection chamber from the at least one of the cyclonic airflow chamber, the dirt cup, and the housing outlet;
    wherein the fine contaminant separation member comprises a plurality of apertures configured for separating fine contaminants from the dirt-containing airstream as the dirt-containing airstream flows by the fine contaminant separation member and for passing the separated fine contaminants into the collection chamber.

2. The vacuum cleaner according to claim 1, wherein the fine contaminant separation member is positioned in the outlet wall.

3. The vacuum cleaner according to claim 2, wherein the housing outlet comprises an outlet chamber having an inlet in fluid communication with the cyclonic airflow chamber and an exhaust conduit.

4. The vacuum cleaner according to claim 3, wherein the outlet chamber further comprises a bottom wall, a top wall and the outlet wall.

5. The vacuum cleaner according to claim 4, and further comprising a guide plate positioned in the outlet chamber for creating a direction change in the path of the dirt-containing airstream in the outlet chamber to aid in the separation of fine contaminants from the dirt-containing airstream.

6. The vacuum cleaner according to claim 5, wherein the guide plate is configured to direct the dirt-containing airstream passing through the outlet through a 180° turn.

7. The vacuum cleaner according to claim 6, wherein the plurality of apertures are transverse to the path of the dirt-containing airstream.

8. The vacuum cleaner according to claim 7 wherein the plurality of apertures are circular in cross-section.

9. The vacuum cleaner according to claim 7, wherein the plurality of apertures are elongated.

10. The vacuum cleaner according to claim 9, wherein the plurality of apertures are formed by louvers.

11. The vacuum cleaner according to claim 5 wherein the guide plate comprises a plurality of vanes for imparting a circular motion to the dirt-containing airstream.

12. The vacuum cleaner according to claim 11, wherein the outlet chamber inlet is positioned centrally with respect to the vanes.

13. The vacuum cleaner according to claim 12 wherein the guide plate is mounted for rotation with respect to the outlet chamber, whereby the guide plate is rotatably driven by the dirt-containing airstream as it passes through the outlet chamber to increase the inertia of the particles in the dirt-containing airstream.

14. The vacuum cleaner according to claim 1 wherein the fine contaminant separation member is formed in both of the cyclone separator sidewall and the dirt cup sidewall.

15. The vacuum cleaner according to claim 1 wherein the apertures in the fine contaminant separation member have a pattern that forms a dead space in the collection chamber, and the fine contaminant separation member partitions the cyclonic airflow chamber from the dead space.

16. The vacuum cleaner according to claim 1 wherein the dirt cup is removably mounted to the cyclonic airflow chamber sidewall.

17. The vacuum cleaner according to claim 1, and further comprising a guide plate positioned in the housing outlet for creating a direction change in the path of the dirt-containing airstream in the housing outlet to aid in the separation of fine contaminants from the dirt-containing airstream.

18. A particle separator comprising:
a housing having a sidewall and a top wall defining a cyclonic airflow chamber for separating contaminants from a dirt-containing airstream, the housing further comprising an inlet and an outlet in fluid communication with the cyclonic airflow chamber, and a dirt cup including a sidewall beneath the cyclone airflow chamber and in communication therewith to receive dirt particles separated from the dirt-containing stream in the cyclonic airflow chamber;
at least one particle collector formed at least in part by a at least one collector side wall and a bottom wall which form a collection chamber having an opening into at least one of the cyclonic airflow chamber, the dirt cup, and the housing outlet; and
a fine contaminant separation member closing the collection chamber opening to separate the collection chamber from the at least one of the cyclonic airflow chamber, the dirt cup, and the housing outlet and having a plurality of apertures that are configured to separate fine contaminants from air in the at least one of the cyclonic airflow chamber, the dirt cup and the housing outlet and for passing the separated fine contaminants into the collection chamber.

19. A vacuum cleaner comprising:
a housing having a sidewall and a top wall defining a cyclonic airflow chamber for separating contaminants from a dirt-containing airstream, the housing further comprising an inlet and an outlet in fluid communication with the cyclonic airflow chamber, the outlet being formed by at least one outlet wall;
a nozzle housing including a main suction opening, the main suction opening being fluidly connected with the housing inlet;
an airstream suction source fluidly connected to the main suction opening and to the cyclonic airflow chamber for transporting dirt-containing air from the main suction opening to the cyclonic airflow chamber, wherein the suction source is adapted to establish and maintain the dirt-containing airstream from the main suction opening to the housing inlet;
a fine contaminant collector formed at least in part by at least one collector sidewall and a bottom wall which form a collection chamber in registry with an opening in the housing outlet wall; and
a fine contaminant separation member closing the opening in the hosing outlet wall to separate the collection chamber from the housing outlet;
wherein the fine contaminant separation member comprises a plurality of apertures that are configured to separate fine contaminants from the dirt-containing airstream as the dirt-containing airstream flows by the fine contaminant separation member and to pass the separated fine contaminants into the collection chamber.

20. The vacuum cleaner of claim 19 wherein the at least one collector side wall is transverse to the side wall in the housing outlet wall.

* * * * *